US012572831B2

(12) United States Patent (10) Patent No.: US 12,572,831 B2
Obisesan et al. (45) Date of Patent: Mar. 10, 2026

(54) SYSTEM, METHOD, AND COMPUTER PROGRAM PRODUCT FOR GENERATING AN INFERENCE USING A MACHINE LEARNING MODEL FRAMEWORK

(71) Applicant: Visa International Service Association, San Francisco, CA (US)

(72) Inventors: Oyindamola Obisesan, Austin, TX (US); Runxin He, Austin, TX (US); Subir Roy, Austin, TX (US); Yu Gu, Austin, TX (US)

(73) Assignee: Visa International Service Association, San Francisco, CA (US)

( * ) Notice: Subject to any disclaimer, the term of this patent is extended or adjusted under 35 U.S.C. 154(b) by 898 days.

(21) Appl. No.: 17/858,164

(22) Filed: Jul. 6, 2022

(65) Prior Publication Data

US 2024/0013071 A1 Jan. 11, 2024

(51) Int. Cl.
*G06N 5/043* (2023.01)
*G06F 9/50* (2006.01)
*G06N 20/00* (2019.01)

(52) U.S. Cl.
CPC ........... *G06N 5/043* (2013.01); *G06F 9/5005* (2013.01); *G06N 20/00* (2019.01)

(58) Field of Classification Search
None
See application file for complete search history.

(56) References Cited

U.S. PATENT DOCUMENTS

2019/0278640 A1* 9/2019 Khare .................... G06F 9/5027
2019/0369984 A1 12/2019 Malladi et al.
2021/0263779 A1 8/2021 Haghighat et al.

* cited by examiner

*Primary Examiner* — Eric Nilsson
(74) *Attorney, Agent, or Firm* — The Webb Law Firm

(57) ABSTRACT

Provided is a system for generating an inference based on real-time selection of a machine learning model using a machine learning model framework that includes at least one processor programmed or configured to receive a request for inference, wherein the request includes a payload, select a machine learning model of a plurality of machine learning models based on the request for inference, determine an aggregation of data based on the machine learning model and the payload of the request, transform the aggregation of data into inference data, wherein the inference data has a configuration that is capable of being processed by the machine learning model, and generate an inference based on the inference data using the machine learning model. Methods and computer program products are also provided.

11 Claims, 11 Drawing Sheets

<u>700</u>

100

300

302

Receive a request for inference

304

Select a machine learning model

306

Determine an aggregation of data

308

Transform the aggregation of data

310

Generate an inference

400

Client Device
106

Request

Inference Service
System
102

405
Receive a request
for inference

400

<u>400</u>

<u>415</u>
Determine an
aggregation of
data

Inference Service
System
<u>102</u>

<u>400</u>

<u>420</u>
Transform the
aggregation of
data

Inference Service
System
<u>102</u>

400

425
Generate an
inference

Inference Service
System
102

<u>500</u>

700

SYSTEM, METHOD, AND COMPUTER PROGRAM PRODUCT FOR GENERATING AN INFERENCE USING A MACHINE LEARNING MODEL FRAMEWORK

BACKGROUND

1. Field

The present disclosure relates generally to systems, devices, products, apparatus, and methods for generating an inference and, in one particular embodiment, to a system, product, and method for generating an inference based on real-time selection of a machine learning model using a machine learning model framework.

2. Technical Considerations

In order to use a machine learning model to generate inferences (e.g., predictions, scores, classifications, and/or the like), the machine learning model may need to be deployed into a production environment (e.g., a runtime environment), such that the machine learning model may receive input data (e.g., input inference data) from users (e.g., users associated with client devices, customers, and/or the like) and provide output (e.g., output inference data) based on the input data. Deployment of a machine learning model may involve integrating (e.g., onboarding, formatting, positioning, and/or the like) a machine learning model into a production environment, such that users may interact with the machine learning model to generate inferences based on input data. The machine learning model executing in the production environment should be accurate to ensure the inferences that the machine learning model may generate are usable.

However, in some instances, ensuring the machine learning model executing in the production environment is accurate may be challenging due to differences between a computer programming language in which the machine learning model is written and a computer programming language in which the production environment is configured and/or is compatible with. Sometimes, differences between the computer programming language in which the machine learning model is written and the computer programming language in which the production environment is configured may result in a need for further development work and redesign of the machine learning model and/or production environment, thus increasing the time required to deploy new machine learning models to the production environment (e.g., to ensure the machine learning is accurate). Additionally, further development work and redesign of the machine learning model and/or production environment may tie up computing resources and cause other problems relating to compatibility between the machine learning model and the production environment.

SUMMARY

Accordingly, systems, devices, products, apparatus, and/or methods for generating an inference based on real-time selection of a machine learning model using a machine learning model framework are disclosed that overcome some or all of the deficiencies of the prior art.

According to non-limiting embodiments or aspects, provided is a computer implemented method, comprising: receiving, with at least one processor, a request for inference, the request comprises a payload; selecting, with at least one processor, a machine learning model of a plurality of machine learning models based on the request for inference; determining, with at least one processor, an aggregation of data based on the machine learning model and the payload of the request; transforming, with at least one processor, the aggregation of data into inference data, the inference data has a configuration that is capable of being processed by the machine learning model; and generating, with at least one processor, an inference based on the inference data using the machine learning model.

According to non-limiting embodiments or aspects, provided is a system comprising at least one processor, the at least one processor is programmed or configured to: receive a request for inference, the request comprises a payload; select a machine learning model of a plurality of machine learning models based on the request for inference; determine an aggregation of data based on the machine learning model and the payload of the request; transform the aggregation of data into inference data, the inference data has a configuration that is capable of being processed by the machine learning model; and generate an inference based on the inference data using the machine learning model.

According to non-limiting embodiments or aspects, provided is a computer program product comprising at least one non-transitory computer-readable medium including one or more instructions that, when executed by at least one processor, cause the at least one processor to: receive a request for inference, the request comprises a payload; select a machine learning model of a plurality of machine learning models based on the request for inference; determine an aggregation of data based on the machine learning model and the payload of the request; transform the aggregation of data into inference data, the inference data has a configuration that is capable of being processed by the machine learning model; and generate an inference based on the inference data using the machine learning model.

Further embodiments are set forth in the following numbered clauses:

Clause 1: A computer implemented method, comprising: receiving, with at least one processor, a request for inference, wherein the request comprises a payload; selecting, with at least one processor, a machine learning model of a plurality of machine learning models based on the request for inference; determining, with at least one processor, an aggregation of data based on the machine learning model and the payload of the request; transforming, with at least one processor, the aggregation of data into inference data, wherein the inference data has a configuration that is capable of being processed by the machine learning model; and generating, with at least one processor, an inference based on the inference data using the machine learning model.

Clause 2: The computer implemented method of clause 1, further comprising: providing the inference to a client that transmitted the request for inference.

Clause 3: The computer implemented method of clauses 1 or 2, further comprising: executing an application programming interface (API) to determine whether an input dataset is available.

Clause 4: The computer implemented method of any of clauses 1-3, further comprising: performing an onboarding process for the machine learning model.

Clause 5: The computer implemented method of any of clauses 1-4, wherein performing the onboarding process for the machine learning model comprises: dynamically loading a sub-class associated with a function based on a template associated with the function and based on logic of the machine learning model.

Clause 6: The computer implemented method of any of clauses 1-5, wherein performing the onboarding process for the machine learning model comprises: determining a sub-class associated with a function based on a template associated with the function and associated with the machine learning model.

Clause 7: The computer implemented method of any of clauses 1-6, wherein generating the inference based on the inference data using the machine learning model comprises: generating an inference score based on the inference data using the machine learning model, wherein the inference score comprises a metric associated with a prediction that a transaction is associated with a predetermined condition.

Clause 8: A system comprising at least one processor, wherein the at least one processor is programmed or configured to: receive a request for inference, wherein the request comprises a payload; select a machine learning model of a plurality of machine learning models based on the request for inference; determine an aggregation of data based on the machine learning model and the payload of the request; transform the aggregation of data into inference data, wherein the inference data has a configuration that is capable of being processed by the machine learning model; and generate an inference based on the inference data using the machine learning model.

Clause 9: The system of clause 8, wherein the at least one processor is further programmed or configured to: provide the inference to a client that transmitted the request for inference.

Clause 10: The system of clauses 8 or 9, wherein the at least one processor is further programmed or configured to: execute an application programming interface (API) to determine whether an input dataset is available.

Clause 11: The system of any of clauses 8-10, wherein the at least one processor is further programmed or configured to: perform an onboarding process for the machine learning model.

Clause 12: The system of any of clauses 8-11, wherein, when performing the onboarding process for the machine learning model, the at least one processor is programmed or configured to: dynamically load a sub-class associated with a function based on a template associated with the function and based on logic of the machine learning model.

Clause 13: The system of any of clauses 8-12, wherein, when performing the onboarding process for the machine learning model, the at least one processor is programmed or configured to: determine a sub-class associated with a function based on a template associated with the function and associated with the machine learning model.

Clause 14: The system of any of clauses 8-13, wherein, when generating the inference based on the inference data using the machine learning model, the at least one processor is programmed or configured to: generate an inference score based on the inference data using the machine learning model, wherein the inference score comprises a metric associated with a prediction that a transaction is associated with a predetermined condition.

Clause 15: A computer program product comprising at least one non-transitory computer-readable medium including one or more instructions that, when executed by at least one processor, cause the at least one processor to: receive a request for inference, wherein the request comprises a payload; select a machine learning model of a plurality of machine learning models based on the request for inference; determine an aggregation of data based on the machine learning model and the payload of the request; transform the aggregation of data into inference data, wherein the inference data has a configuration that is capable of being processed by the machine learning model; and generate an inference based on the inference data using the machine learning model.

Clause 16: The computer program product of clause 15, wherein the one or more instructions further cause the at least one processor to: provide the inference to a client that transmitted the request for inference.

Clause 17: The computer program product of clauses 15 or 16, wherein the one or more instructions further cause the at least one processor to: execute an application programming interface (API) to determine whether an input dataset is available.

Clause 18: The computer program product of any of clauses 15-17, wherein the one or more instructions further cause the at least one processor to: perform an onboarding process for the machine learning model.

Clause 19: The computer program product of any of clauses 15-18, wherein the one or more instructions that cause the at least one processor to perform the onboarding process for the machine learning model cause the at least one processor to: dynamically load a sub-class associated with a function based on a template associated with the function and based on logic of the machine learning model.

Clause 20: The computer program product of any of clauses 15-19, wherein the one or more instructions that cause the at least one processor to perform the onboarding process for the machine learning model cause the at least one processor to: determine a sub-class associated with a function based on a template associated with the function and associated with the machine learning model.

These and other features and characteristics of the present disclosure, as well as the methods of operation and functions of the related elements of structures and the combination of parts and economies of manufacture, will become more apparent upon consideration of the following description and the appended claims with reference to the accompanying drawings, all of which form a part of this specification, wherein like reference numerals designate corresponding parts in the various figures. It is to be expressly understood, however, that the drawings are for the purpose of illustration and description only and are not intended as a definition of the limits of the present disclosure. As used in the specification and the claims, the singular form of "a," "an," and "the" include plural referents unless the context clearly dictates otherwise.

BRIEF DESCRIPTION OF THE DRAWINGS

Additional advantages and details of the present disclosure are explained in greater detail below with reference to the exemplary embodiments that are illustrated in the accompanying schematic figures, in which.

DETAILED DESCRIPTION

Figure 1:
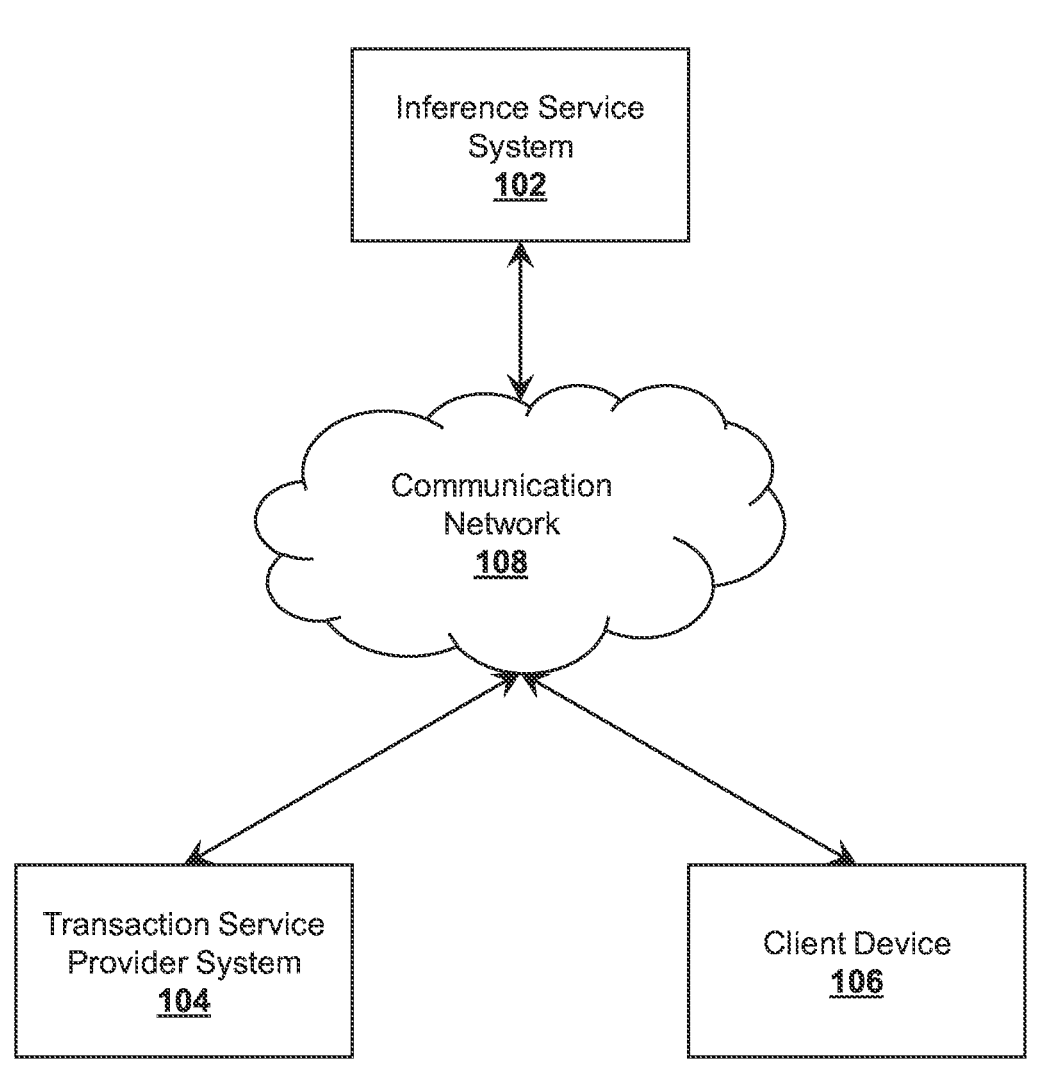
FIG. 1 is a diagram of a non-limiting embodiment or aspect of an environment in which systems, devices, products, apparatus, and/or methods, described herein, may be implemented according to the principles of the present disclosure.

For purposes of the description hereinafter, the terms "end," "upper," "lower," "right," "left," "vertical," "horizontal," "top," "bottom," "lateral," "longitudinal," and derivatives thereof shall relate to the disclosure as it is oriented in the drawing figures. However, it is to be understood that the disclosure may assume various alternative variations and step sequences, except where expressly specified to the contrary. It is also to be understood that the specific devices and processes illustrated in the attached drawings, and described in the following specification, are simply exemplary embodiments or aspects of the disclosure. Hence, specific dimensions and other physical characteristics related to the embodiments or aspects of the embodiments disclosed herein are not to be considered as limiting unless otherwise indicated.

No aspect, component, element, structure, act, step, function, instruction, and/or the like used herein should be construed as critical or essential unless explicitly described as such. In addition, as used herein, the articles "a" and "an" are intended to include one or more items and may be used interchangeably with "one or more" and "at least one." Furthermore, as used herein, the term "set" is intended to include one or more items (e.g., related items, unrelated items, a combination of related and unrelated items, etc.) and may be used interchangeably with "one or more" or "at least one." Where only one item is intended, the term "one" or similar language is used. Also, as used herein, the terms "has," "have," "having," or the like are intended to be open-ended terms. Further, the phrase "based on" is intended to mean "based at least partially on" unless explicitly stated otherwise. The phase "based on" may also mean "in response to" where appropriate.

As used herein, the terms "communication" and "communicate" may refer to the reception, receipt, transmission, transfer, provision, and/or the like of information (e.g., data, signals, messages, instructions, commands, and/or the like). For one unit (e.g., a device, a system, a component of a device or system, combinations thereof, and/or the like) to be in communication with another unit means that the one unit is able to directly or indirectly receive information from and/or send (e.g., transmit) information to the other unit. This may refer to a direct or indirect connection that is wired and/or wireless in nature. Additionally, two units may be in communication with each other even though the information transmitted may be modified, processed, relayed, and/or routed between the first and second unit. For example, a first unit may be in communication with a second unit even though the first unit passively receives information and does not actively transmit information to the second unit. As another example, a first unit may be in communication with a second unit if at least one intermediary unit (e.g., a third unit located between the first unit and the second unit) processes information received from the first unit and transmits the processed information to the second unit. In some non-limiting embodiments, a message may refer to a network packet (e.g., a data packet and/or the like) that includes data.

As used herein, the terms "issuer," "issuer institution," "issuer bank," or "payment device issuer," may refer to one or more entities that provide accounts to individuals (e.g., users, customers, and/or the like) for conducting payment transactions, such as credit payment transactions and/or debit payment transactions. For example, an issuer institution may provide an account identifier, such as a primary account number (PAN), to a customer that uniquely identifies one or more accounts associated with that customer. In some non-limiting embodiments, an issuer may be associated with a bank identification number (BIN) that uniquely identifies the issuer institution. As used herein, the term "issuer system" may refer to one or more computer systems operated by or on behalf of an issuer, such as a server executing one or more software applications. For example, an issuer system may include one or more authorization servers for authorizing a transaction.

As used herein, the term "transaction service provider" may refer to an entity that receives transaction authorization requests from merchants or other entities and provides guarantees of payment, in some cases through an agreement between the transaction service provider and an issuer institution. For example, a transaction service provider may include a payment network such as Visa®, MasterCard®, American Express®, or any other entity that processes transactions. As used herein, the term "transaction service provider system" may refer to one or more computer systems operated by or on behalf of a transaction service provider, such as a transaction service provider system executing one or more software applications. A transaction service provider system may include one or more processors and, in some non-limiting embodiments or aspects, may be operated by or on behalf of a transaction service provider.

As used herein, the term "merchant" may refer to one or more entities (e.g., operators of retail businesses) that provide goods and/or services, and/or access to goods and/or services, to a user (e.g., a customer, a consumer, and/or the like) based on a transaction, such as a payment transaction. As used herein, the term "merchant system" may refer to one or more computer systems operated by or on behalf of a merchant, such as a server executing one or more software applications. As used herein, the term "product" may refer to one or more goods and/or services offered by a merchant.

As used herein, the term "acquirer" may refer to an entity licensed by the transaction service provider and approved by the transaction service provider to originate transactions (e.g., payment transactions) involving a payment device associated with the transaction service provider. As used herein, the term "acquirer system" may also refer to one or more computer systems, computer devices, and/or the like operated by or on behalf of an acquirer. The transactions the acquirer may originate may include payment transactions (e.g., purchases, original credit transactions (OCTs), account funding transactions (AFTs), and/or the like). In some non-limiting embodiments, the acquirer may be authorized by the transaction service provider to assign merchant or service providers to originate transactions involving a payment device associated with the transaction service provider. The acquirer may contract with payment facilitators to enable the payment facilitators to sponsor merchants. The acquirer may monitor compliance of the payment facilitators in accordance with regulations of the transaction service provider. The acquirer may conduct due diligence of the payment facilitators and ensure proper due diligence occurs before signing a sponsored merchant. The acquirer may be liable for all transaction service provider programs that the acquirer operates or sponsors. The acquirer may be responsible for the acts of the acquirer's payment facilitators, merchants that are sponsored by the acquirer's payment facilitators, and/or the like. In some non-limiting embodiments, an acquirer may be a financial institution, such as a bank.

As used herein, the term "payment gateway" may refer to an entity and/or a payment processing system operated by or on behalf of such an entity (e.g., a merchant service provider, a payment service provider, a payment facilitator, a payment facilitator that contracts with an acquirer, a payment aggregator, and/or the like), which provides payment services (e.g., transaction service provider payment services, payment processing services, and/or the like) to one or more merchants. The payment services may be associated with the use of portable financial devices managed by a transaction service provider. As used herein, the term "payment gateway system" may refer to one or more computer systems, computer devices, servers, groups of servers, and/or the like operated by or on behalf of a payment gateway.

As used herein, the terms "client" and "client device" may refer to one or more computing devices, such as processors, storage devices, and/or similar computer components, that access a service made available by a server. In some non-limiting embodiments, a client device may include a computing device configured to communicate with one or more networks and/or facilitate transactions such as, but not limited to, one or more desktop computers, one or more portable computers (e.g., tablet computers), one or more mobile devices (e.g., cellular phones, smartphones, personal digital assistant, wearable devices, such as watches, glasses, lenses, and/or clothing, and/or the like), and/or other like devices. Moreover, the term "client" may also refer to an entity that owns, utilizes, and/or operates a client device for facilitating transactions with another entity.

As used herein, the term "server" may refer to one or more computing devices, such as processors, storage devices, and/or similar computer components that communicate with client devices and/or other computing devices over a network, such as the Internet or private networks and, in some examples, facilitate communication among other servers and/or client devices.

As used herein, the term "system" may refer to one or more computing devices or combinations of computing devices such as, but not limited to, processors, servers, client devices, software applications, and/or other like components. In addition, reference to "a server" or "a processor," as used herein, may refer to a previously-recited server and/or processor that is recited as performing a previous step or function, a different server and/or processor, and/or a combination of servers and/or processors. For example, as used in the specification and the claims, a first server and/or a first processor that is recited as performing a first step or function may refer to the same or different server and/or a processor recited as performing a second step or function.

Non-limiting embodiments or aspects of the present disclosure are directed to systems, methods, and computer program products for generating an inference based on real-time selection of a machine learning model using a machine learning model framework. In some non-limiting embodiments or aspects, an inference service system may include at least one processor programmed or configured to perform an inference task using a machine learning model framework, the system comprising: at least one processor programmed or configured to: receive a request for inference, wherein the request comprises a payload; select a machine learning model of a plurality of machine learning models based on the request for inference; determine an aggregation of data based on the machine learning model and the payload of the request; transform the aggregation of data into inference data, wherein the inference data has a configuration that is capable of being processed by the machine learning model; and generate an inference based on the inference data using the machine learning model.

In this way, the inference service systems, methods and/or computer program products may reduce an amount of time to develop (e.g., development time) and/or an amount of time to perform system redesign (e.g., redesign time, rework, configuration, and/or the like) that may otherwise be required by minimizing differences between a computer programming language in which a machine learning model is written and a computer programming language in which a production environment (e.g., a runtime environment) is configured and/or is compatible with by providing a generic framework that may be compatible with any production environment. Non-limiting embodiments may include the generic framework which may be capable of communicating with any client device (e.g., a user, a user of a client device, and/or the like) via an application programming interface (API) without additional development time and/or system redesign time, thus reducing an amount of time for onboarding for client devices, as well as providing an interface that may be compatible with any client device without requiring additional development time and/or system redesign. Non-limiting embodiments may also reduce the computing resources required and memory capacity required to generate an inference using a machine learning model because the generic framework and the interface that may be compatible with any client device may allow client devices to reuse training codes (e.g., training datasets and logic associated with training datasets), thus reducing onboarding time for client devices. Additionally, non-limiting embodiments may reduce an amount of time required to deploy new machine learning models to the production environment by providing the generic framework that may be capable of onboarding new machine learning models with reduced development time and/or system redesign time.

Non-limiting embodiments may reduce the amount of computing resources required when onboarding a new machine learning model by requiring less input (e.g., input from a user, input from a client device) when onboarding a new machine learning model, and thus, reducing onboarding time of a new machine learning model. Furthermore, reduced development time and/or system redesign time of the machine learning model (e.g., a new machine learning model) and/or the production environment may reduce the amount of computing resources required and may reduce errors relating to compatibility between the machine learning model and the production environment. Finally, non-limiting embodiments may reduce the computation time of generating an inference as non-limiting embodiments may load only one machine learning model based on a request from a client device without having to load multiple machine learning models. In this way, non-limiting embodiments may maintain the capability to implement multiple machine learning models with the generic framework and select one of the machine learning models when the machine learning model is requested by the client device, reducing overall computation time of generating an inference. For example, tests of non-limiting embodiments of the inference service system have shown the inference service system to execute 95% of requests in less than 2 milliseconds per each request when the inference service system was testing with 10,000 requests at a rate of 1000 requests per second. Thus, non-limiting embodiments may reduce the computation time, as well as the amount of computing resources used by loading one machine learning model within the machine learning model framework based on the request for inference transmitted by the client device and selected by the inference service system.

Referring now to FIG. 1, FIG. 1 is a diagram of an example environment 100 in which devices, systems, and/or methods, described herein, may be implemented. As shown in FIG. 1, environment 100 may include inference service system 102, transaction service provider system 104, client device 106, and communication network 108. Inference service system 102, transaction service provider system 104, and/or client device 106 may interconnect (e.g., establish a connection to communicate) via wired connections, wireless connections, or a combination of wired and wireless connections.

Inference service system 102 may include one or more devices configured to communicate with transaction service provider system 104 and/or client device 106 via communication network 108. For example, inference service system 102 may include a server, a group of servers, and/or other like devices. In some non-limiting embodiments or aspects, inference service system 102 may be associated with a transaction service provider system, as described herein. Additionally or alternatively, inference service system 102 may generate (e.g., train, validate, retrain, and/or the like), store, and/or implement (e.g., operate, provide inputs to and/or outputs from, and/or the like) one or more machine learning models. For example, inference service system 102 may generate one or more machine learning models by fitting (e.g., validating) one or machine learning models against data used for training (e.g., training data). In some non-limiting embodiments or aspects, inference service system 102 may be in communication with one or more data storage devices (e.g., a database, data warehouse, data lake, and/or the like), which may be local or remote to inference service system 102. In some non-limiting embodiments or aspects, inference service system 102 may be capable of receiving information from, storing information in, transmitting information to, and/or searching information stored in the data storage device.

Transaction service provider system 104 may include one or more devices configured to communicate with inference service system 102 and/or client device 106 via communication network 108. For example, transaction service provider system 104 may include a computing device, such as a server, a group of servers, and/or other like devices. In some non-limiting embodiments or aspects, transaction service vice provider system 104 may be associated with a transaction service provider system as discussed herein. In some non-limiting embodiments or aspects, inference service system 102 may be a component of (e.g., part of) transaction service provider system 104. In some non-limiting embodiments or aspects, transaction service provider system 104 may be in communication with a database such that transaction service provider system 104 may transmit data to and/or receive data from the database.

Client device 106 may include a computing device configured to communicate with inference service system 102 and/or transaction service provider system 104 via communication network 108. For example, client device 106 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, client device 106 may be associated with a user (e.g., an individual operating client device 106). In some non-limiting embodiments or aspects, client device 106 may be a component of (e.g., part of) inference service system 102.

Communication network 108 may include one or more wired and/or wireless networks. For example, communication network 108 may include a cellular network (e.g., a long-term evolution (LTE®) network, a third generation (3G) network, a fourth generation (4G) network, a fifth generation (5G) network, a code division multiple access (CDMA) network, etc.), a public land mobile network (PLMN), a local area network (LAN), a wide area network (WAN), a metropolitan area network (MAN), a telephone network (e.g., the public switched telephone network (PSTN) and/or the like), a private network, an ad hoc network, an intranet, the Internet, a fiber optic-based network, a cloud computing network, and/or the like, and/or a combination of some or all of these or other types of networks.

The number and arrangement of devices and networks shown in FIG. 1 are provided as an example. There may be additional devices and/or networks, fewer devices and/or networks, different devices and/or networks, or differently arranged devices and/or networks than those shown in FIG. 1. Furthermore, two or more devices shown in FIG. 1 may be implemented within a single device, or a single device shown in FIG. 1 may be implemented as multiple, distributed devices. Additionally or alternatively, a set of devices (e.g., one or more devices) of environment 100 may perform one or more functions described as being performed by another set of devices of environment 100.

Figure 2:
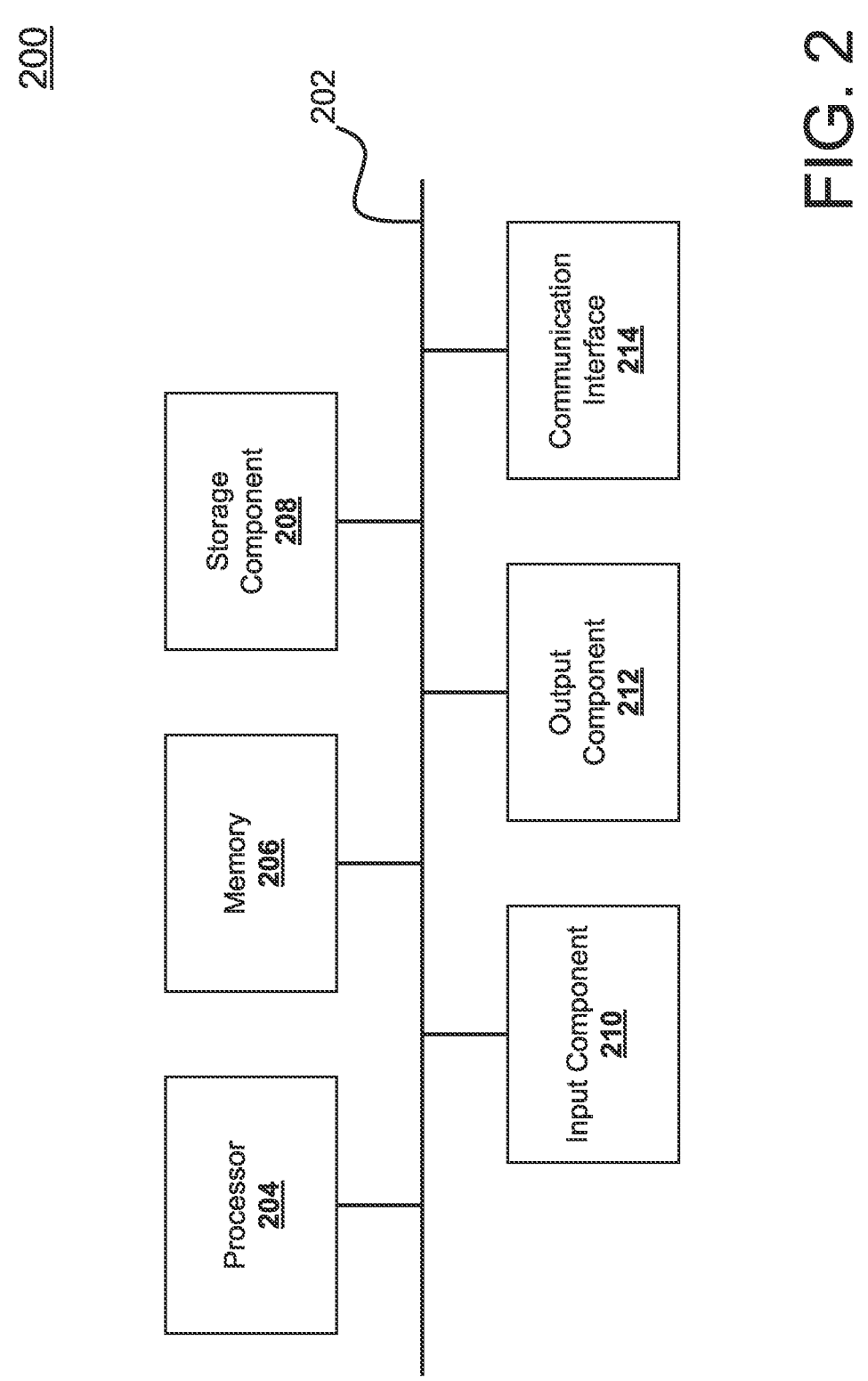
FIG. 2 is a diagram of a non-limiting embodiment or aspect of components of one or more devices of FIG. 1.

Referring now to FIG. 2, FIG. 2 is a diagram of example components of a device 200. Device 200 may correspond to inference service system 102 (e.g., one or more devices of inference service system 102), transaction service provider system 104 (e.g., one or more devices of transaction service provider system 104), and/or client device 106. In some non-limiting embodiments or aspects, inference service system 102, transaction service provider system 104, and/or client device 106 may include at least one device 200 and/or at least one component of device 200. As shown in FIG. 2, device 200 may include bus 202, processor 204, memory 206, storage component 208, input component 210, output component 212, and communication interface 214.

Bus 202 may include a component that permits communication among the components of device 200. In some non-limiting embodiments, processor 204 may be implemented in hardware, software, or a combination of hardware and software. For example, processor 204 may include a processor (e.g., a central processing unit (CPU), a graphics processing unit (GPU), an accelerated processing unit (APU), etc.), a microprocessor, a digital signal processor (DSP), and/or any processing component (e.g., a field-programmable gate array (FPGA), an application-specific integrated circuit (ASIC), etc.) that can be programmed to perform a function. Memory 206 may include random access memory (RAM), read-only memory (ROM), and/or another type of dynamic or static storage memory (e.g., flash memory, magnetic memory, optical memory, etc.) that stores information and/or instructions for use by processor 204.

Storage component 208 may store information and/or software related to the operation and use of device 200. For example, storage component 208 may include a hard disk (e.g., a magnetic disk, an optical disk, a magneto-optic disk, a solid state disk, etc.), a compact disc (CD), a digital versatile disc (DVD), a floppy disk, a cartridge, a magnetic tape, and/or another type of computer-readable medium, along with a corresponding drive.

Input component 210 may include a component that permits device 200 to receive information, such as via user input (e.g., a touch screen display, a keyboard, a keypad, a mouse, a button, a switch, a microphone, etc.). Additionally or alternatively, input component 210 may include a sensor for sensing information (e.g., a global positioning system (GPS) component, an accelerometer, a gyroscope, an actuator, etc.). Output component 212 may include a component that provides output information from device 200 (e.g., a display, a speaker, one or more light-emitting diodes (LEDs), etc.).

Communication interface 214 may include a transceiver-like component (e.g., a transceiver, a separate receiver and transmitter, etc.) that enables device 200 to communicate with other devices, such as via a wired connection, a wireless connection, or a combination of wired and wireless connections. Communication interface 214 may permit device 200 to receive information from another device and/or provide information to another device. For example, communication interface 214 may include an Ethernet interface, an optical interface, a coaxial interface, an infrared interface, a radio frequency (RF) interface, a universal serial bus (USB) interface, a Wi-Fi® interface, a cellular network interface, and/or the like.

Device 200 may perform one or more processes described herein. Device 200 may perform these processes based on processor 204 executing software instructions stored by a computer-readable medium, such as memory 206 and/or storage component 208. A computer-readable medium (e.g., a non-transitory computer-readable medium) is defined herein as a non-transitory memory device. A memory device includes memory space located inside of a single physical storage device or memory space spread across multiple physical storage devices.

Software instructions may be read into memory 206 and/or storage component 208 from another computer-readable medium or from another device via communication interface 214. When executed, software instructions stored in memory 206 and/or storage component 208 may cause processor 204 to perform one or more processes described herein. Additionally or alternatively, hardwired circuitry may be used in place of or in combination with software instructions to perform one or more processes described herein. Thus, embodiments described herein are not limited to any specific combination of hardware circuitry and software.

The number and arrangement of components shown in FIG. 2 are provided as an example. In some non-limiting embodiments, device 200 may include additional components, fewer components, different components, or differently arranged components than those shown in FIG. 2. Additionally or alternatively, a set of components (e.g., one or more components) of device 200 may perform one or more functions described as being performed by another set of components of device 200.

Figure 3:
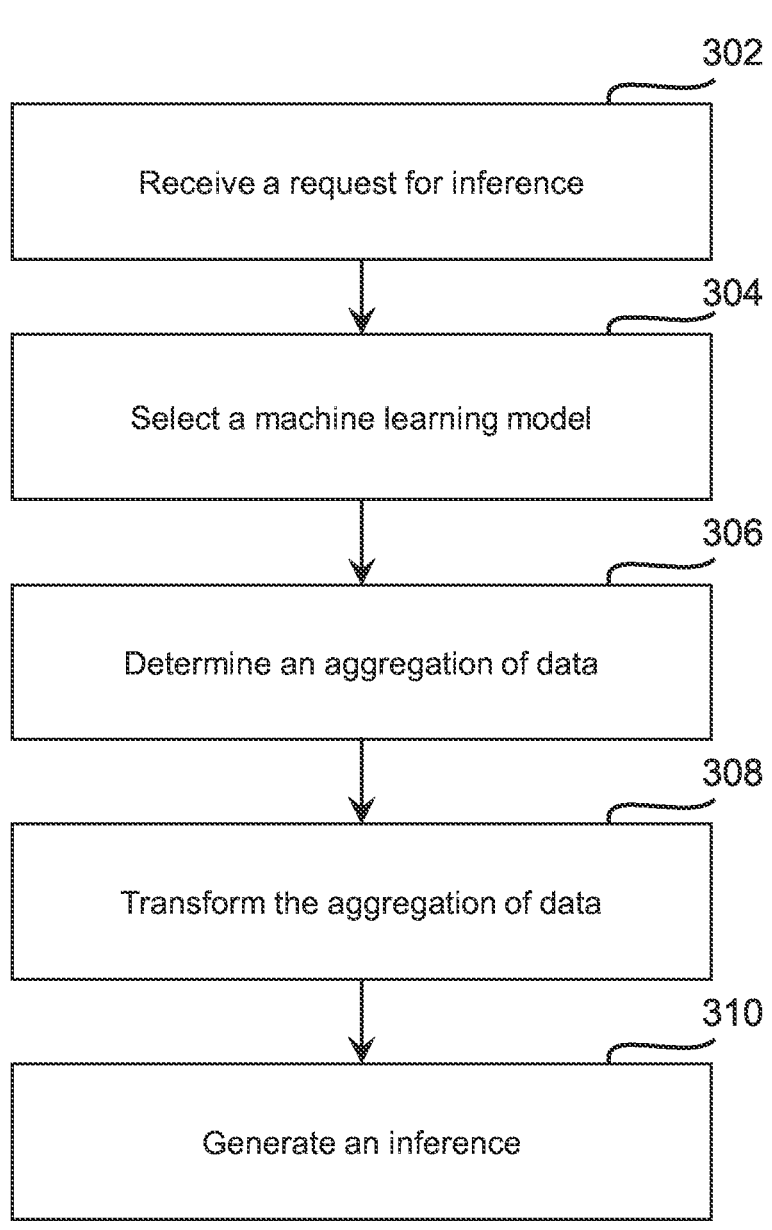
FIG. 3 is a flowchart of a non-limiting embodiment or aspect of a process for generating an inference based real-time selection of a machine learning model using a machine learning model framework.

Referring now to FIG. 3, FIG. 3 is a flowchart of a non-limiting embodiment or aspect of a process 300 for generating an inference based on real-time selection of a machine learning model using a machine learning model framework. In some non-limiting embodiments or aspects, one or more of the steps of process 300 may be performed (e.g., completely, partially, etc.) by inference service system 102 (e.g., one or more devices of inference service system 102). In some non-limiting embodiments or aspects, one or more of the steps of process 300 may be performed (e.g., completely, partially, etc.) by another device or a group of devices separate from or including inference service system 102 (e.g., one or more devices of inference service system 102), transaction service provider system 104 (e.g., one or more devices of transaction service provider system 104), and/or client device 106.

In some non-limiting embodiments or aspects, one or more of the steps of a process (e.g., process 300) may be performed during a training phase. The training phase may include an environment (e.g., a training environment) and/or a time period (e.g., training phase, model building phase, and/or the like) where a machine learning model (e.g., a machine learning algorithm) may be trained. Training may refer to inputting training input data (e.g., a training dataset) into one or more machine learning algorithms and/or models (e.g., one or more machine learning algorithms and/or models of inference service system 102), applying labels to the training input data for training, and/or mapping the training input data to one or more target values (e.g., ground truth values, the values that a trained machine learning model may predict, and/or the like), for the purpose of generating a trained machine learning model. In some non-limiting embodiments or aspects, training may be performed during a training phase before a testing phase and before a runtime (e.g., inference) phase. During a time period associated with the training phase, the machine learning model (e.g., machine learning algorithm) may process the input data to find patterns in the input data that map the input data (e.g., features and/or attributes of the input data) to the one or more target values to generate the trained machine learning model.

In some non-limiting embodiments or aspects, one or more of the steps of a process (e.g., process 300) may be performed during a testing phase. The testing phase may include an environment (e.g., a testing environment) and/or a time period (e.g., a testing phase, model evaluation phase, and/or the like) where a machine learning model (e.g., a trained machine learning model, a trained inference model, and/or the like) may be tested (e.g., evaluated, validated, and/or the like). Testing (e.g., evaluating) may refer to inputting testing input data (e.g., a testing dataset) into one or more trained machine learning models (e.g., one or more trained machine learning models of inference service system 102) and/or determining a metric associated with an accuracy of the trained machine learning model based on the testing input data. In some non-limiting embodiments or aspects, the testing input data may include a sample of data including target values generated during the training phase based on the training input data (e.g., output from the training phase, a sample of data that has labels applied with the target values during training). In some non-limiting embodiments or aspects, determining a metric associated with an accuracy of the trained machine learning model based on the testing input data may include comparing the testing input data with testing output data (e.g., test inferences, test predictions) from the trained machine learning model. For example, a metric associated with an accuracy may be determined by comparing labels applied to the testing output data with the target values of the sample of data in the testing input data. In some non-limiting embodiments or aspects, testing may be performed during a testing phase after a training phase and before deployment of the machine learning model and/or a runtime (e.g., inference) phase. During a time period associated with the testing phase, the machine learning model (e.g., the trained machine learning model) may process the training input data to determine a metric associated with the accuracy of the trained machine learning model to test and/or evaluate the trained machine learning model.

In some non-limiting embodiments or aspects, one or more of the steps of a process (e.g., process 300) may be performed during a runtime phase. The runtime phase may include an environment (e.g., a runtime environment) and/or a time period (e.g., a runtime phase) where a trained and/or tested machine learning model (e.g., a runtime machine learning model, a production inference model, and/or the like) may be used to generate inferences (e.g., predictions, real-time inferences, and/or the like). Runtime (e.g., production) may refer to inputting runtime data (e.g., a runtime dataset, real-world data, observations, inference data, and/or the like) into one or more trained and/or tested machine learning models (e.g., one or more trained machine learning models of inference service system 102) and/or generating an inference (e.g., generating an inference using inference service system 102). In some non-limiting embodiments or aspects, the runtime input data may include a sample of data that is received by the trained machine learning model in real-time with respect to the runtime input data being generated. For example, runtime input data may be generated by a data source (e.g., a customer performing a transaction) and may be subsequently received by the trained machine learning model in real-time. In some non-limiting embodiments or aspects, runtime may be performed during a runtime phase after a training phase and after deployment of the machine learning model. During a time period associated with the runtime phase, the machine learning model (e.g., the trained machine learning model) may process runtime input data to generate inferences (e.g., real-time inferences).

In some non-limiting embodiments or aspects, real-time may refer to an instant in time with respect to the occurrence of an event (e.g., real-time with respect to a transaction, real-time with respect to data being generated, real-time with respect to the reading or writing of data, etc.) where a response may occur within a specified time, generally a relatively short time. For example, real-time may refer to an instant in time where an inference is generated by a machine learning model (e.g., a machine learning model of inference service system 102) concurrent with or shortly after (e.g., within milliseconds) the generation of input data and/or the receipt of the input data by the machine learning model. As a further example, a real-time output may be generated with respect to a real-time input concurrent with or within milliseconds of receiving the real-time input (e.g., a transaction may be approved immediately concurrent with or shortly after the transaction is initiated by a customer).

As shown in FIG. 3, at step 302, process 300 may include receiving a request for inference. For example, inference service system 102 may receive a request for inference. In some non-limiting embodiments or aspects, inference service system 102 may receive the request for inference from transaction service provider system 104 and/or client device 106. In some non-limiting embodiments or aspects, the request for inference may include a payload and/or a header. In some non-limiting embodiments or aspects, the request for inference may be based on an API protocol (e.g., a remote procedure call (RPC) API, a Google Remote Procedure Call (gRPC®) API, and/or the like). In some non-limiting embodiments or aspects, the request for inference may include a method call (e.g., procedure call, function call, and/or the like) to an API.

As shown in FIG. 3, at step 304, process 300 may include selecting a machine learning model. For example, inference service system 102 may select a machine learning model from a plurality of machine learning models. In some non-limiting embodiments or aspects, the plurality of machine learning models may include convolutional neural networks (CNNs), gradient boosted decision trees (GBDTs) (e.g., XGBoost and/or the like), deep neural networks (DNNs), support vector machine (SVM), k-means clustering, random forests, machine learning platforms (e.g., Tensorflow® and/or the like), any combination thereof, and/or the like. In some non-limiting embodiments or aspects, inference service system 102 may select the machine learning model based on the request for inference.

In some non-limiting embodiments or aspects, inference service system 102 may train each machine learning model of the plurality of machine learning models. For example, inference service system 102 may train each machine learning model of the plurality of machine learning models based on a training dataset. In some non-limiting embodiments or aspects, inference service system 102 may receive the training dataset (e.g., raw data) from a database. In some non-limiting embodiments or aspects, inference service system 102 may determine an aggregation of data based on the raw data. Inference service system 102 may use the aggregation of data for training a machine learning model of the plurality of machine learning models.

In some non-limiting embodiments or aspects, an aggregation (e.g., an aggregation of data) may refer to a process and/or function by which multiple pieces of data (e.g., rows, entries, and/or the like from a database) are grouped together to form a single value. For the purpose of illustration, an aggregation may be a count, an average, a maximum, a minimum, a median, a mode, a sum, and/or the like. Additionally, aggregations of data may show historical trends, behaviors, and/or the like associated with various attributes. In some non-limiting embodiments or aspects, aggregation of data may include historical aggregation of data and/or real-time aggregation of data (e.g., real-time with respect to the generation and collection of data).

In some non-limiting embodiments or aspects, inference service system 102 may transform the aggregation of data into training data. In some non-limiting embodiments or aspects, the training data may be used as input to a machine learning model of the plurality of machine learning models to train each machine learning model.

As shown in FIG. 3, at step 306, process 300 may include determining an aggregation of data. For example, inference service system 102 may determine an aggregation of data. In some non-limiting embodiments or aspects, inference service system 102 may determine the aggregation of data based on the machine learning model (e.g., the selected machine learning model) and/or the payload of the request for inference.

As shown in FIG. 3, at step 308, process 300 may include transforming the aggregation of data. For example, inference service system 102 may transform the aggregation of data into inference data (e.g., input data, an input dataset, an assembled dataset, and/or the like). In some non-limiting embodiments or aspects, inference service system 102 may transform the aggregation of data into inference data, such that the inference data has a configuration that is capable of being processed by the machine learning model. In some non-limiting embodiments or aspects, if inference service system 102 does not transform the aggregation of data into inference data or if inference service system 102 is unsuccessful in transforming the aggregation of data into inference data, then the machine learning model may not be capable of processing the inference data. For example, the machine learning model may not be capable of accepting the inference data as input and/or the machine learning model may fail (e.g., throw an exception, halt execution) when processing the inference data that was unsuccessfully transformed by inference service system 102.

As shown in FIG. 3, at step 310, process 300 may include generating an inference. For example, inference service system 102 may generate an inference. In some non-limiting embodiments or aspects, inference service system 102 may generate an inference based on the inference data using the machine learning model. For example, inference service system 102 (e.g., the machine learning model of inference service system 102) may generate an inference based on receiving the inference data as input to the machine learning model and processing the inference data using the machine learning model.

In some non-limiting embodiments or aspects, inference service system 102 may provide the inference to a client. For example, inference service system 102 may provide the inference to client device 106. In some non-limiting embodiments or aspects, inference service system 102 may provide the inference to the client that transmitted the request for inference to inference service system 102. In some non-limiting embodiments or aspects, inference service system 102 may generate the inference in real-time with respect to receiving the request for inference from client device 106. Additionally of alternatively, inference service system 102 may provide the inference to client 106 in real-time with respect to receiving the request for inference and/or with respect to generating the inference.

In some non-limiting embodiments or aspects, when generating the inference based on the inference data using the machine learning model, inference service system 102 may generate an inference score. For example, inference service system 102 may generate an inference score based on the inference data using the machine learning model. In some non-limiting embodiments or aspects, the inference score may include a metric associated with a prediction that a transaction is associated with a predetermined condition. For example, the inference score may include a value ranging from 0.0 to 1.0 where the value is associated with a prediction that a transaction is fraudulent or not fraudulent. In some non-limiting embodiments or aspects, the predetermined condition may include whether a transaction is fraudulent, a likelihood that a transaction is fraudulent, a location where a subsequent transaction may occur, and/or the like.

In some non-limiting embodiments or aspects, inference service system 102 may perform an onboarding process for a machine learning model. For example, inference service system 102 may perform an onboarding process for the machine learning model of the plurality of machine learning models. In some non-limiting embodiments or aspects, inference service system 102 may perform an onboarding process for a new machine learning model, such that the new machine learning model will be added to the plurality of machine learning models. In this way, inference service system 102 may allow for more efficient onboarding of new models based on the capability of inference service system 102 to generalize different types of machine learning models.

In some non-limiting embodiments or aspects, when performing the onboarding process, inference service system 102 may dynamically load a sub-class associated with a function (e.g., orchestration, transformation, aggregation, scoring, and/or the like) based on a template associated with the function and based on logic of the machine learning model. For example, inference service system 102 may dynamically load a sub-class associated with a transformation (e.g., a transformation function) based on a template (e.g., a base class) associated with a transformation (e.g., a transformation function) and based on logic of the machine learning model (e.g., the machine learning model selected by inference service system 102).

In some non-limiting embodiments or aspects, each function of a plurality of functions may be associated with a microservice component (e.g., a microservice application) that is implemented in (e.g., part of) inference service system 102. For example, inference service system 102 may include at least one microservice component associated with an orchestration function, at least one microservice component associated with a transformation function, at least one microservice component associated with an aggregation function, and at least one microservice component associated with a scoring function.

A microservice component and/or a microservice application may refer to a loosely-coupled software application and/or a loosely-coupled software service that follows a microservice architecture. In the microservice architecture, software services are fine-grained and the protocols are lightweight and may have interfaces which are treated as a public API. The microservice application may exist and may be reusable (e.g., portable to other software applications and/or systems without requiring changes to the microservice application) independent of other microservice applications. Loose coupling may refer to the practice of developing and/or designing software services, such that some dependencies are reduced and the complexities around dependencies of the software service are minimized. Communication requirements for the microservice application may also be reduced based on the microservice architecture. The microservice application may have a single responsibility or may offer a single service to the applications and/or systems the microservice application executes with. One or more microservice applications may be used in a single application and/or system (e.g., anomaly detection system 102) to provide desired functionality of that application and/or system.

In some non-limiting embodiments or aspects, when performing the onboarding process, inference service system 102 may determine a sub-class associated with a function (e.g., orchestration, transformation, aggregation, scoring, and/or the like) based on a template (e.g., base class) associated with the function and associated with the machine learning model. For example, inference service system 102 may determine a sub-class associated with a transformation (e.g., a transformation function) based on a template associated with a transformation (e.g., a base class associated with a transformation) and associated with the machine learning model (e.g., the machine learning model selected by inference service system 102).

In some non-limiting embodiments or aspects, after performing the onboarding process for the machine learning model (e.g., a new machine learning model), inference service system 102 may monitor the machine learning model. For example, inference service system 102 may monitor the machine learning model for issues that may occur in data mismatch, data integrity, and data drift. In some non-limiting embodiments or aspects, inference service system 102 may monitor the machine learning model by continually analyzing the performance of the machine learning model using real-world data and detecting changes in metrics associated with the machine learning model (e.g., accuracy, precision, F1-score, and/or the like).

In some non-limiting embodiments or aspects, inference service system 102 may execute an API to determine whether an input dataset (e.g., inference data) is available. For example, inference service system 102 may execute an API (e.g., an API call and/or an API request to another component that is part of inference service system 102 or a component that is not part of inference service system 102) based on the request for inference received from client device 106. In some non-limiting embodiments or aspects, inference service system 102 may execute an API using a microservice component of inference service system 102 to determine whether an input dataset is available for inputting the input dataset into one or more machine learning models (e.g., the machine learning model selected by inference service system 102). For example, inference service system 102 may execute an API using a scoring microservice, such that the scoring microservice may execute an API call to a transformation microservice to determine whether an input dataset is available for inputting the input dataset into one or more machine learning models. The scoring microservice may receive a response (e.g., an API response) from the transformation microservice based on executing the API. The response may include an indication of whether an input dataset is available. In some non-limiting embodiments or aspects, if an input dataset is available, inference service system 102 may execute an API (e.g., using a scoring microservice) to retrieve the input dataset, such that inference microservice may transmit the input dataset to one or more machine learning models.

Referring now to FIGS. 4A-4E, FIGS. 4A-4E are diagrams of non-limiting embodiments or aspects of an implementation 400 of a process (e.g., process 300) for generating an inference based on real-time selection of a machine learning model using a machine learning model framework. As shown in FIGS. 4A-4E, implementation 400 may include inference service system 102 performing the steps of the process.

Figure 4A:
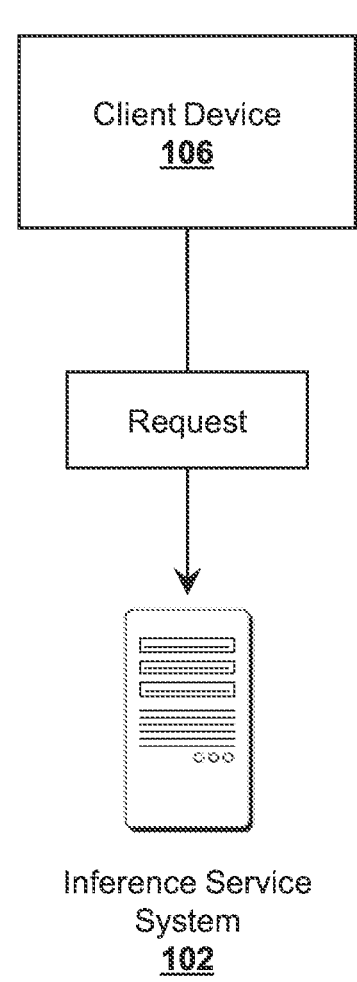
FIGS. 4A-4E are diagrams of non-limiting embodiments or aspects of an implementation of a process for generating an inference based on real-time selection of a machine learning model using a machine learning model framework.

As shown by reference number 405 in FIG. 4A, inference service system 102 may receive a request for inference. For example, inference service system 102 may receive a request for inference from client device 106. In some non-limiting embodiments or aspects, inference service system 102 may respond (e.g., transmit a response) based on the request for inference by transmitting a response including an inference to client device 106 that transmitted the request for inference.

In some non-limiting embodiments or aspects, inference service system 102 may receive the request for inference based on an API (e.g., an API call). For example, inference service system 102 may receive the request for inference based on client device 106 executing an API call to inference service system 102. The API may be defined in any suitable API framework and/or communication protocol (e.g., remote procedure call (RPC) such as gRPC® by Google® and/or the like).

In some non-limiting embodiments or aspects, inference service system 102 may receive a request for inference using one or more microservice components (e.g., software components). For example, inference service system 102 may receive the request for inference from client device 106 using a gateway microservice that is implemented as a component of (e.g., part of) inference service system 102. In some non-limiting embodiments or aspects, the gateway microservice of inference service system 102 may authorize client device 106 based on the request for inference.

Figure 4B:
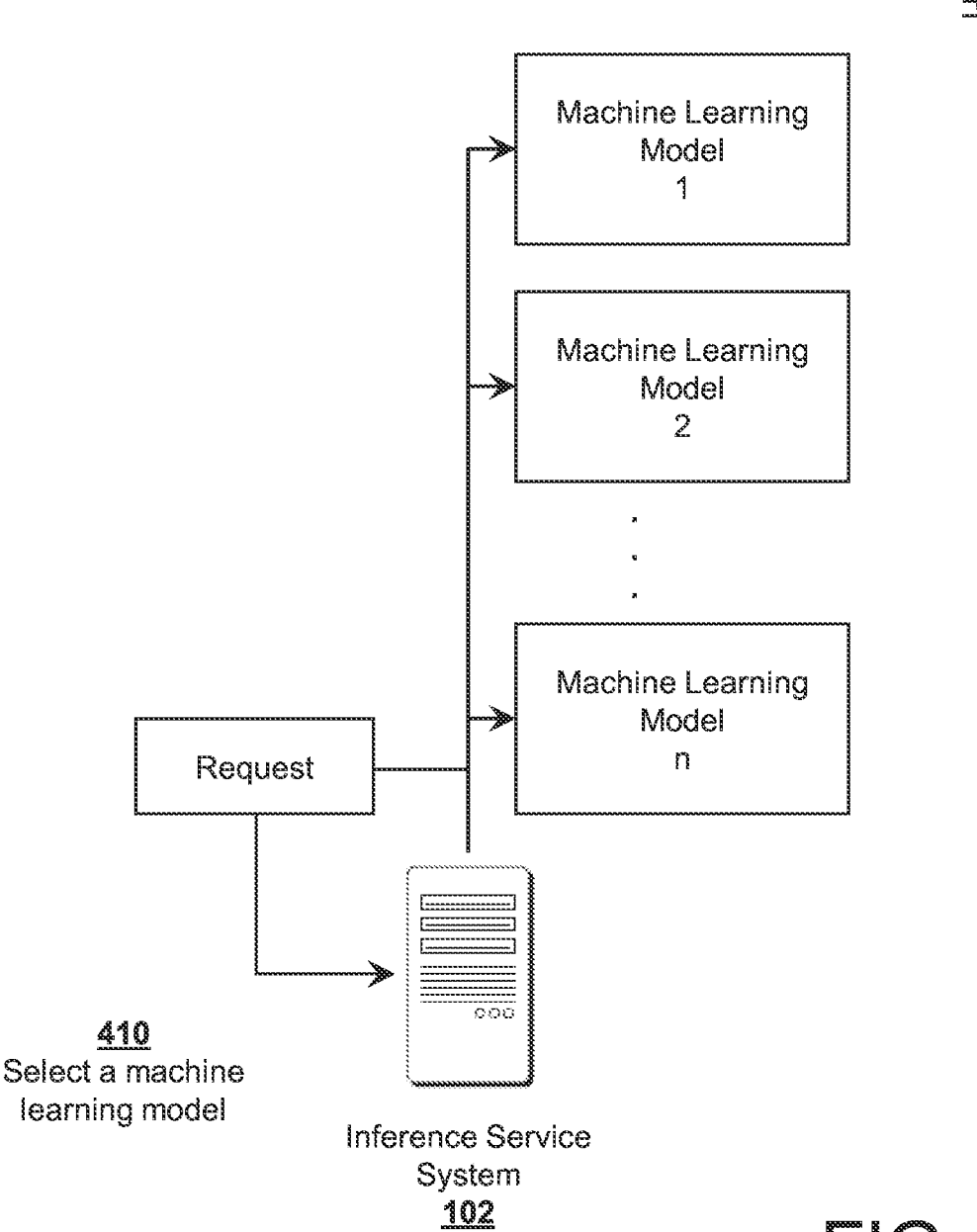

As shown by reference number 410 in FIG. 4B, inference service system 102 may select a machine learning model. For example, inference service system 102 may select a machine learning model from a plurality of machine learning models including n machine learning models, where n is a total number of machine learning models included in inference service system 102. In some non-limiting embodiments or aspects, inference service system 102 may select the machine learning model from the plurality of machine learning models based on the request for inference received by inference service system 102. In some non-limiting embodiments or aspects, the gateway microservice of inference service system 102 may select the machine learning model of the plurality of machine learning models based on the request for inference.

In some non-limiting embodiments or aspects, one or more machine learning models of the plurality of machine learning models may include trained and/or tested machine learning models. For example, one or more machine learning models of the plurality of machine learning models may include a runtime machine learning model which may be capable of generating an inference in real-time (e.g., with respect to the request for inference).

Figure 4C:
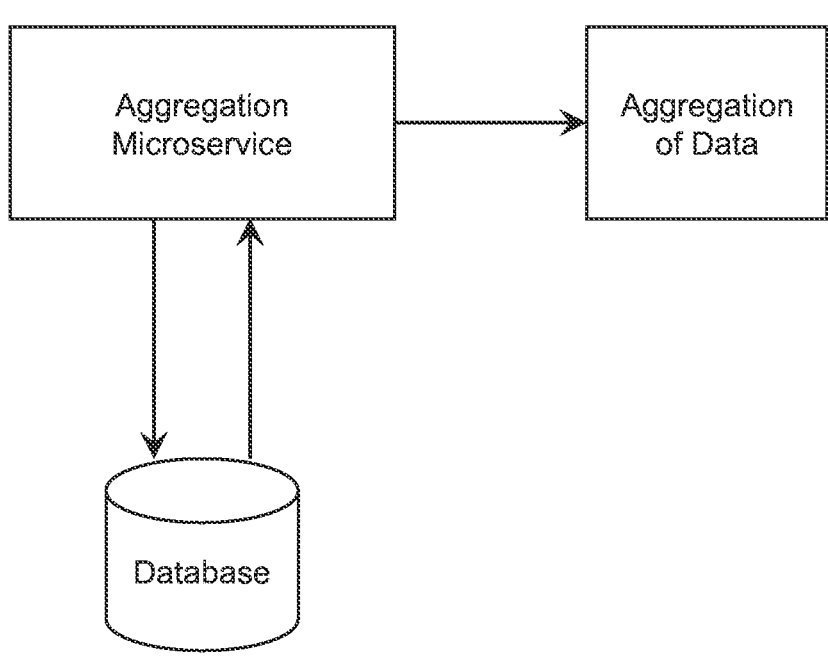
Figure 4C:
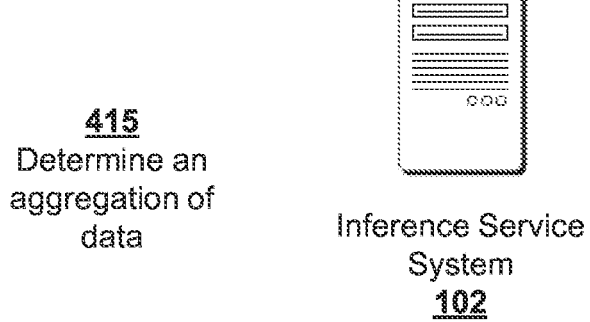

As shown by reference number 415 in FIG. 4C, inference service system 102 may determine an aggregation of data. For example, inference service system 102 may determine an aggregation of data based on the machine learning model (e.g., the machine learning model selected by inference service system 102). In some non-limiting embodiments or aspects, inference service system 102 may determine the aggregation of data based on the payload of the request for inference. In some non-limiting embodiments or aspects, inference service system 102 may determine the aggregation of data based on data (e.g., raw data).

In some non-limiting embodiments or aspects, inference service system 102 may determine the aggregation of data using a microservice component (e.g., software component). For example, inference service system 102 may determine an aggregation of data using an aggregation microservice that is implemented as a component of (e.g., part of) inference service system 102. Inference service system 102 may dynamically load the aggregation microservice (e.g., load the aggregation microservice in real-time based on the request for inference). In some non-limiting embodiments or aspects, inference service system 102 may dynamically load different aggregation microservices (e.g., aggregation microservices which may generate different aggregations of data including different properties) based on the request for inference and a type of aggregation operation requested by client device 106.

In some non-limiting embodiments or aspects, inference service system 102 may retrieve raw data (e.g., raw data associated with the request) from a database. In some non-limiting embodiments or aspects, the database may be a component of (e.g., part of) inference service system 102 or the database may be separate from inference service system 102. In some non-limiting embodiments or aspects, inference service system 102 may retrieve the raw data from the database using an aggregation microservice (e.g., a software component). In some non-limiting embodiments or aspects, the aggregation microservice may be a component of (e.g., part of) inference service system 102 or the aggregation microservice may be separate from inference service system 102.

In some non-limiting embodiments or aspects, the aggregation microservice (e.g., aggregation microservice component) of inference service system 102 may transmit a request for data (e.g., raw data) to a database and/or other data source (e.g., data warehouse, data lake, and/or the like). For example, inference service system 102 may transmit a request for data to a database in real-time (e.g., with respect to inference service system 102 receiving the request for inference) using the aggregation microservice. The aggregation microservice may generate and transmit the request to the database. In some non-limiting embodiments or aspects, the aggregation microservice (e.g., aggregation microservice component) of inference service system 102 may receive data from the database. For example, inference service system 102 may receive data from the database in real-time (e.g., with respect to inference service system 102 receiving the request for inference and/or transmitting the request for data) using the aggregation microservice. The aggregation microservice may generate and transmit the request to the database.

In some non-limiting embodiments or aspects, inference service system 102 may transmit a request for data to the database in real-time with the collection of the data and/or storage of the data in the database (e.g., with respect to the collection and/or storage of the data in the database). For example, inference service system 102 may transmit a request for data to the database in real-time with respect to a transaction and/or the collection and storage of data associated with the transaction.

In some non-limiting embodiments or aspects, inference service system 102 may determine the aggregation of data based on the raw data retrieved from the database. For example, inference service system 102 may determine the aggregation of data by receiving the raw data as input to the aggregation microservice and/or by receiving the raw data as input to inference service system 102 and communicating the raw data to the aggregation microservice. The aggregation microservice may determine the aggregation of data by processing the raw data. The aggregation microservice may process the raw data by performing an aggregation operation (e.g., sum, count, mean, group by, and/or the like) on the raw data to generate (e.g., output, provide) the aggregation of data. The aggregation microservice may communicate the aggregation of data to another microservice and/or another component (e.g., software component) of inference service system 102.

Figure 4D:
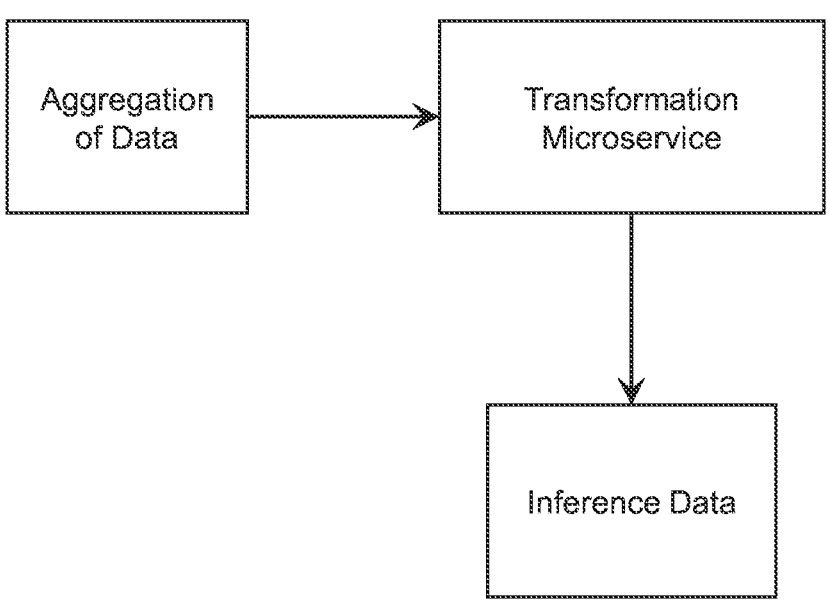
Figure 4D:
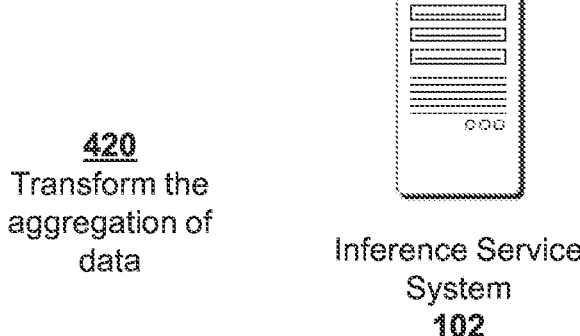

As shown by reference number 420 in FIG. 4D, inference service system 102 may transform the aggregation of data. For example, inference service system 102 may transform the aggregation of data into inference data (e.g., input data, an input dataset, an assembled dataset, and/or the like). In some non-limiting embodiments or aspects, inference service system 102 may transform the aggregation of data into inference data based on the machine learning model and/or a format of the aggregation of data.

In some non-limiting embodiments or aspects, inference service system 102 may transform the aggregation of data using a microservice component (e.g., software component). For example, inference service system 102 may transform the aggregation of data using a transformation microservice that is implemented as a component of (e.g., part of) inference service system 102. Inference service system 102 may dynamically load the transformation microservice (e.g., load the transformation microservice in real-time based on the request for inference). In some non-limiting embodiments or aspects, inference service system 102 may dynamically load different transformation microservices (e.g., transformation microservices which may perform different transformation operations on the aggregation of data) based on the request for inference and a type of transformation operation requested by client device 106.

In some non-limiting embodiments or aspects, inference service system 102 may communicate the aggregation of data from the aggregation microservice (e.g., a software component of inference service system 102) to the transformation microservice (e.g., a software component of inference service system 102). In some non-limiting embodiments or aspects, the transformation microservice may be implemented as a component of (e.g., part of) inference service system 102 or the transformation microservice may be separate from inference service system 102.

In some non-limiting embodiments or aspects, inference service system 102 may determine inference data based on the aggregation of data determined by the aggregation microservice. For example, inference service system 102 may determine inference data by communicating the aggregation of data from the aggregation microservice to the transformation microservice. The transformation microservice may generate the inference data by processing the aggregation of data. The transformation microservice may process the aggregation of data by performing one or more transformation operations (e.g., normalizing the data, removing repeated data instances, changing data types, resolving missing data, and/or the like) on the aggregation of data to generate (e.g., output, provide) the inference data. The transformation microservice may communicate the inference data to another microservice, a machine learning model, and/or another component (e.g., software component) of inference service system 102.

Figure 4E:
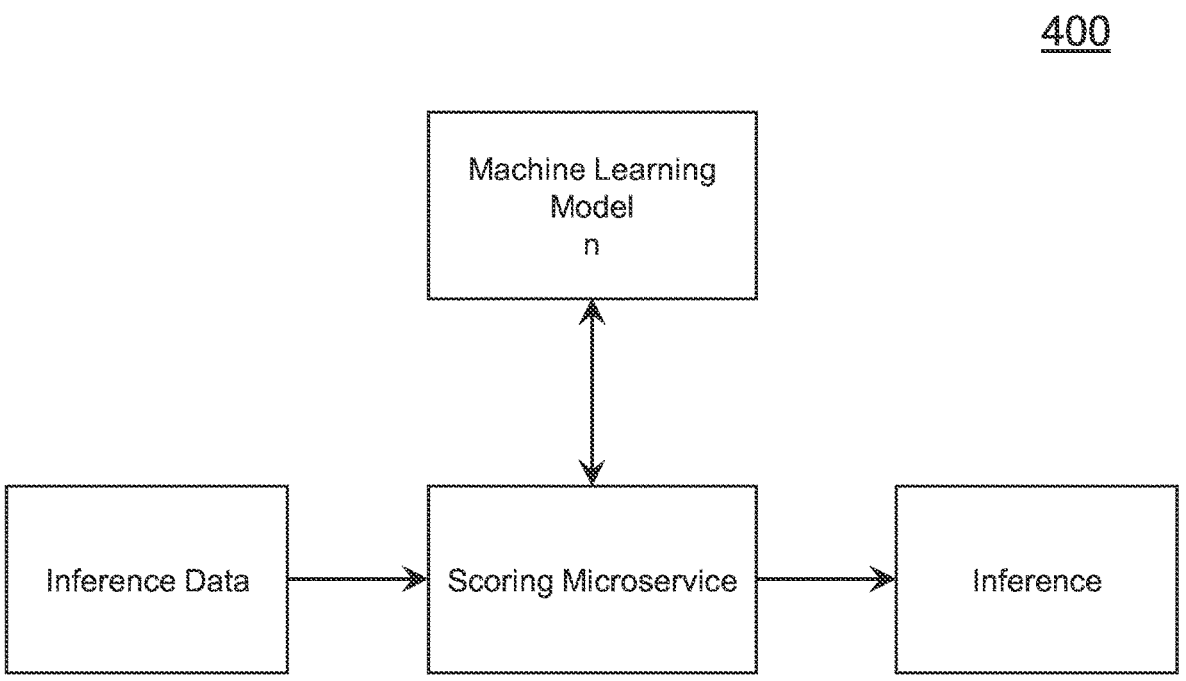
Figure 4E:
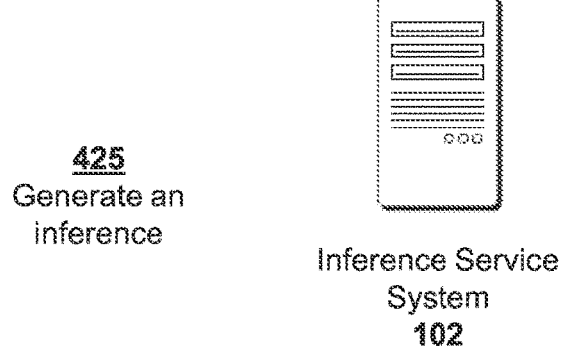

As shown by reference number 425 in FIG. 4E, inference service system 102 may generate an inference. For example, inference service system 102 may generate an inference based on the inference data using the machine learning model (e.g., the machine learning model selected by inference service system 102).

In some non-limiting embodiments or aspects, inference service system 102 may generate the inference using a microservice component (e.g., software component). For example, inference service system 102 may generate the inference using a scoring microservice that is implemented as a component of (e.g., part of) inference service system 102. Inference service system 102 may dynamically load the scoring microservice (e.g., load the scoring microservice in real-time based on the request for inference). In some non-limiting embodiments or aspects, inference service system 102 may dynamically load different scoring microservices (e.g., scoring microservices which may perform different scoring operations on the inference data and/or scoring microservices which may include different machine learning models of the plurality of machine learning models) based on the request for inference and a type of scoring operation (e.g., type of machine learning model, the selected machine learning model, and/or the like) requested by client device 106.

In some non-limiting embodiments or aspects, inference service system 102 may communicate the inference data from the transformation microservice (e.g., a software component of inference service system 102) to the scoring microservice (e.g., a software component of inference service system 102). In some non-limiting embodiments or aspects, the scoring microservice may be implemented as a component of (e.g., part of) inference service system 102 or the scoring microservice may be separate from inference service system 102. In some non-limiting embodiments or aspects, the scoring microservice of inference service system 102 may communicate with one or more machine learning models of the plurality of machine learning models. For example, inference service system 102 may communicate the inference data to one or more machine learning models of the plurality of machine learning models (e.g., the machine learning model selected by inference service system 102) using the scoring microservice.

Figure 5:
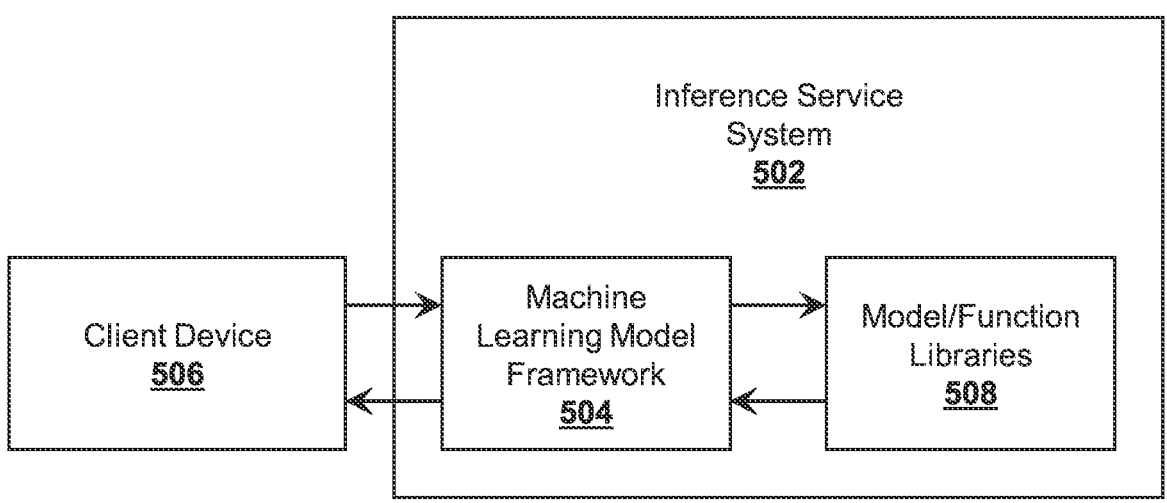
FIG. 5 is a diagram of a non-limiting embodiment or aspect of an implementation in which systems, devices, products, apparatus, and/or methods, described herein, may be implemented according to the principles of the present disclosure.

Referring now to FIG. 5, FIG. 5 is a diagram of a non-limiting embodiment or aspect of an implementation 500 in which systems, devices, products, apparatus, and/or methods, described herein, may be implemented according to the principles of the present disclosure. As shown in FIG. 5, implementation 500 may include inference service system 502 performing the steps of the process.

As shown in FIG. 5, implementation 500 may include inference service system 502, machine learning model framework 504, client device 506, and model and/or function libraries 508. In some non-limiting embodiments or aspects, inference service system 502 may be the same as or similar to inference service system 102. Inference service system 502 may include machine learning model framework 504 and model and/or function libraries 508.

In some non-limiting embodiments or aspects, machine learning model framework 504 may include one or more microservice components (e.g., software components). For example, machine learning model framework 504 may include a gateway microservice, an orchestrator microservice, an aggregation microservice, a transformation microservice, a scoring microservice, and/or any combination thereof. In some non-limiting embodiments or aspects, one or more microservice components of machine learning model framework 504 may use and/or may be implemented using one or more software components (e.g., Dagster® and/or the like) to facilitate a generic machine learning model framework that is testable and that may enhance the real-time model inference and maintenance of inference service system 502 and/or inference service system 102. In some non-limiting embodiments or aspects, machine learning model framework 504 may communicate with model and/or function libraries 508 and/or client device 506.

In some non-limiting embodiments or aspects, client device 506 may include a computing device configured to communicate with inference service system 502 via a communication network (e.g., communication network 108 and/or the like). For example, client device 506 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, client device 506 may be associated with a user (e.g., an individual operating client device 506). In some non-limiting embodiments or aspects, client device 506 may be a component of (e.g., part of) inference service system 502. In some non-limiting embodiments or aspects, machine learning model framework 504 may be in communication with client device 506 and/or model and/or function libraries 508.

In some non-limiting embodiments or aspects, model and/or function libraries 508 may include one or more machine learning models. For example, model and/or function libraries 508 may include one or more machine learning models that may be selected by inference service system 502 based on a request for inference received from client device 506. In some non-limiting embodiments or aspects, model and/or function libraries 508 may include one or more functions to facilitate scoring (e.g., scoring of inference data), updating one or more machine learning models, and/or improve model onboarding (e.g., adding a new machine learning model or new type of machine learning model to the one or more machine learning models and/or inference service system 502). In some non-limiting embodiments or aspects, model and/or function libraries 508 may communicate with machine learning model framework 504.

In some non-limiting embodiments or aspects, model and/or function libraries 508 may include one or more microservice components (e.g., software components). In some non-limiting embodiments or aspects, one or more microservice components of model and/or function libraries 508 may use and/or may be implemented using one or more other software components (e.g., Ray Serve) to facilitate improved machine learning model deployment that is faster, more efficient, and requires less resources and less manual development to deploy a new machine learning model.

In some non-limiting embodiments or aspects, inference service system 502 may receive a request for inference using one or more microservice components (e.g., software components). For example, inference service system 502 may receive the request for inference from client device 506 using a gateway microservice that is implemented as a component of (e.g., part of) machine learning model framework 504 and/or inference service system 502. In some non-limiting embodiments or aspects, the gateway microservice of inference service system 502 may select a machine learning model of a plurality of machine learning models based on the request for inference. In some non-limiting embodiments or aspects, the gateway microservice of inference service system 502 may authorize client device 506 based on the request for inference.

In some non-limiting embodiments or aspects, inference service system 502 may determine an aggregation of data based on the machine learning model (e.g., the machine learning model selected by the gateway microservice of inference service system 502) and a payload of the request for inference using one or more microservice components (e.g., software components). For example, inference service system 502 may determine an aggregation of data based on the machine learning model and the payload of the request using an aggregation microservice that is implemented as a component of (e.g., part of) machine learning model framework 504 and/or inference service system 502.

In some non-limiting embodiments or aspects, inference service system 502 may transform the aggregation of data into inference data using one or more microservice components (e.g., software components). For example, inference service system 502 may transform the aggregation of data into inference data using a transformation microservice that is implemented as a component of (e.g., part of) machine learning model framework 504 and/or inference service system 502.

In some non-limiting embodiments or aspects, inference service system 502 may generate an inference using one or more microservice components (e.g., software components). For example, inference service system 502 may generate an inference based on the inference data using a scoring microservice that is implemented as a component of (e.g., part of) machine learning model framework 504 and/or inference service system 502. In some non-limiting embodiments or aspects, the scoring microservice of machine learning model framework 504 and/or inference service system 502 may communicate with model and/or function libraries 508. For example, inference service system 502 may communicate inference data to one or more machine learning models of the plurality of machine learning models of model and/or function libraries 508 using machine learning model framework 504.

In some non-limiting embodiments or aspects, model and/or function libraries 508 may generate the inference using one or more machine learning models. For example, inference service system 502 may generate the inference using one or more machine learning models of model and/or function libraries 508. In some non-limiting embodiments or aspects, inference service system 502 may communicate the inference to machine learning model framework 504 (e.g., the scoring microservice of machine learning model framework 504) using model and/or function libraries 508. In some non-limiting embodiments or aspects, the scoring microservice of machine learning model framework 504 may augment the inference by providing a reason code (e.g., a reason code generated by the scoring microservice) with the inference.

The number and arrangement of devices and networks shown in FIG. 5 are provided as an example. There may be additional devices and/or networks, fewer devices and/or networks, different devices and/or networks, or differently arranged devices and/or networks than those shown in FIG. 5. Furthermore, two or more devices shown in FIG. 5 may be implemented within a single device, or a single device shown in FIG. 5 may be implemented as multiple, distributed devices. Additionally or alternatively, a set of devices (e.g., one or more devices) of implementation 500 may perform one or more functions described as being performed by another set of devices of implementation 500. In some non-limiting embodiments or aspects, one or more components of FIG. 5, including one or more microservice components, may be implemented using computer programming languages, such as Google® Go, Java®, Python®, JavaScript Object Notation (JSON), any combination thereof, and/or the like.

Figure 6:
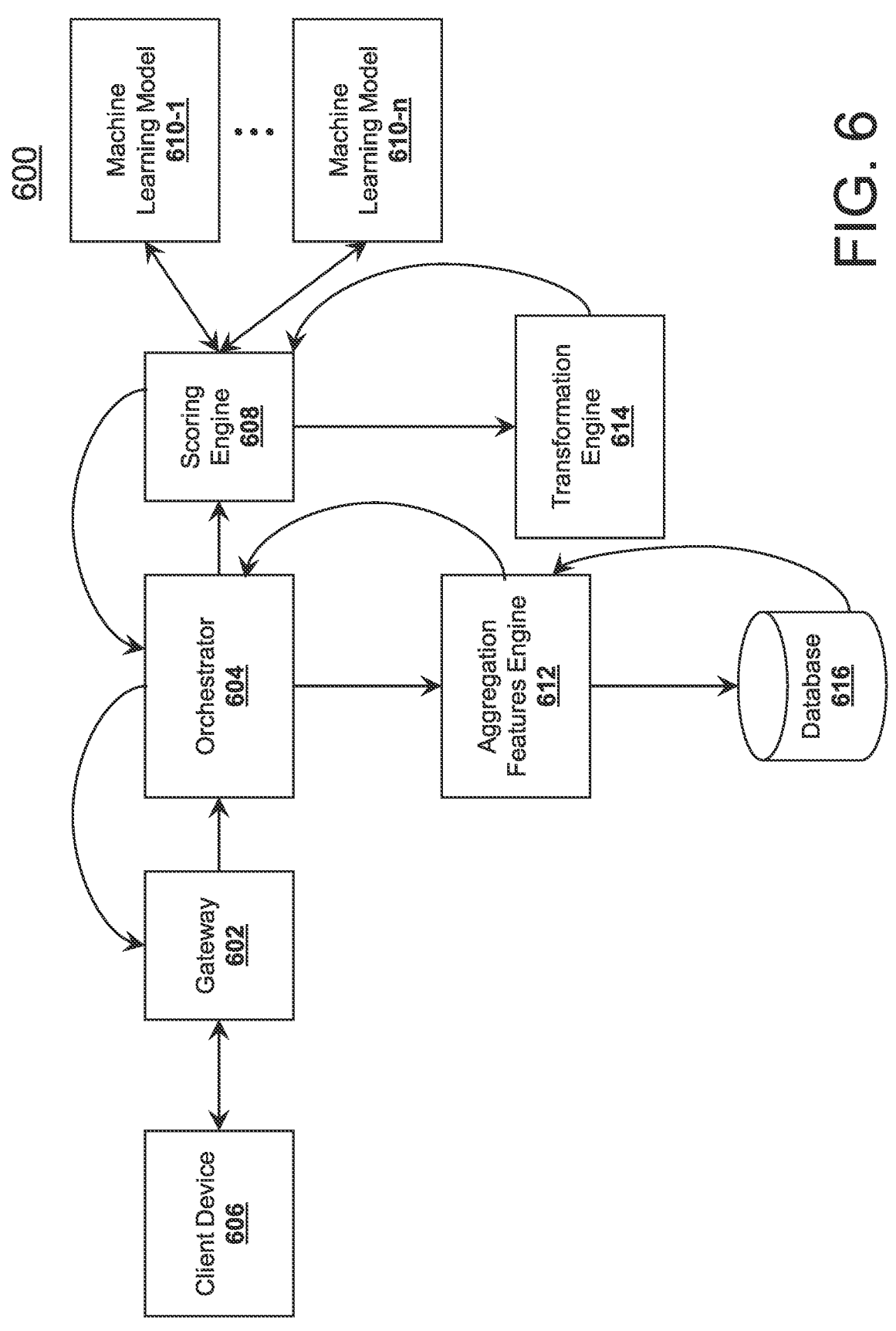
FIG. 6 is a diagram of a non-limiting embodiment or aspect of an implementation in which systems, devices, products, apparatus, and/or methods, described herein, may be implemented according to the principles of the present disclosure.

Referring now to FIG. 6, FIG. 6 is a diagram of a non-limiting embodiment or aspect of an implementation 600 in which systems, devices, products, apparatus, and/or methods, described herein, may be implemented according to the principles of the present disclosure. As shown in FIG. 6, implementation 600 may include one or more components of inference service system 102 and/or inference service system 502.

As shown in FIG. 6, implementation 600 may include gateway 602, orchestrator 604, client device 606, scoring engine 608, machine learning model 610-1 to machine learning model 610-n (e.g., a plurality of machine learning models, referred to individually as machine learning model 610 and collectively as machine learning models 610 where appropriate), aggregation features engine 612, transformation engine 614, and database 616. In some non-limiting embodiments or aspects, client device 606 may be the same as or similar to client device 106 and/or client device 506. In some non-limiting embodiments or aspects, gateway 602, orchestrator 604, client device 606, scoring engine 608, machine learning model 610-1 to machine learning model 610-n, aggregation features engine 612, transformation engine 614, and/or database 616 may include software components including software instructions, hardware components (e.g., hardware components described herein and shown in FIG. 2), or any combination thereof.

In some non-limiting embodiments or aspects, gateway 602 may include a microservice component (e.g., software component). For example, gateway 602 may be the same as or similar to the gateway microservice as described herein. In some non-limiting embodiments or aspects, gateway 602 may be a component of (e.g., part of) inference service system 102 and/or inference service system 502. In some non-limiting embodiments or aspects, gateway 602 may be in communication with orchestrator 604 and/or client device 606. Gateway 602 may receive a request for inference from client device 606 and/or may transmit an inference to client device 606.

In some non-limiting embodiments or aspects, gateway 602 may communicate with client device 606 via an API. For example, client device 606 may transmit a request to gateway 602 where the request may satisfy a communication protocol defined in the API. In some non-limiting embodiments or aspects, the API (e.g., the communication protocol of the API) may be configured using a framework (e.g., a software component with generic functionality) for communication protocols (e.g., gRPC®, and/or the like). In some non-limiting embodiments or aspects, gateway 602 may receive a request for inference from client device 606. In some non-limiting embodiments or aspects, gateway 602 may authorize a request for inference based on a header of the request, a token included with the request, and/or another method for authorization.

In some non-limiting embodiments or aspects, gateway 602 may transmit a message to client device 606 (e.g., confirmation message, authorization message, and/or the like). For example, gateway 602 may transmit a message to client device 606 including an inference based on client device 606 transmitting a request for inference after scoring engine 608 and/or machine learning models 610 generate an inference based on the request for inference. In some non-limiting embodiments or aspects, gateway 602 may select a machine learning model from machine learning models 610 based on the request for inference.

In some non-limiting embodiments or aspects, orchestrator 604 may include a microservice component (e.g., software component). For example, orchestrator 604 may be the same as or similar to the orchestration microservice as described herein. In some non-limiting embodiments or aspects, orchestrator 604 may be a component of (e.g., part of) inference service system 102 and/or inference service system 502. In some non-limiting embodiments or aspects, orchestrator 604 may be in communication with gateway 602, scoring engine 608, and/or aggregation features engine 612. For example, orchestrator 604 may receive a request from gateway 602 and/or may transmit a response to gateway 602. Orchestrator 604 may transmit a request to scoring engine 608 and/or may receive a response from scoring engine 608. Orchestrator 604 may transmit a request to aggregation features engine 612 and/or may receive a response from aggregation features engine 612.

In some non-limiting embodiments or aspects, orchestrator 604 may communicate with gateway 602, scoring engine 608, and/or aggregation features engine 612 via an API. For example, orchestrator 604 may transmit a request to scoring engine 608 and/or aggregation features engine 612 where the request may satisfy a communication protocol defined in the API. Orchestrator 604 may transmit a response to gateway 602 where the response satisfies the communication protocol defined in the API. In some non-limiting embodiments or aspects, the API (e.g., the communication protocol of the API) may be configured using a framework for communication protocols. In some non-limiting embodiments or aspects, orchestrator 604 may receive a response from scoring engine 608 and/or aggregation features engine 612 based on a request transmitted to scoring engine 608 and/or aggregation features engine 612. In some non-limiting embodiments or aspects, orchestrator 604 may receive a request from gateway 602 including the payload of the request for inference and data associated with the machine learning model that was selected by gateway 602.

In some non-limiting embodiments or aspects, client device 606 may include a computing device configured to communicate with inference service system 102 and/or inference service system 502 via a communication network (e.g., communication network 108 and/or the like) and gateway 602. For example, client device 606 may include a computing device, such as a desktop computer, a portable computer (e.g., tablet computer, a laptop computer, and/or the like), a mobile device (e.g., a cellular phone, a smartphone, a personal digital assistant, a wearable device, and/or the like), and/or other like devices. In some non-limiting embodiments or aspects, client device 606 may be associated with a user (e.g., an individual operating client device 606). In some non-limiting embodiments or aspects, client device 606 may be in communication with gateway 602 (e.g., where gateway 602 is a component of inference service system 102 and/or inference service system 502).

In some non-limiting embodiments or aspects, scoring engine 608 may include a microservice component (e.g., software component). For example, scoring engine 608 may be the same as or similar to the scoring microservice as described herein. In some non-limiting embodiments or aspects, scoring engine 608 may be a component of (e.g., part of) inference service system 102 and/or inference service system 502. In some non-limiting embodiments or aspects, scoring engine 608 may be in communication with orchestrator 604, machine learning models 610, and/or transformation engine 614. For example, scoring engine 608 may receive a request from orchestrator 604 and/or may transmit a response to orchestrator 604. Scoring engine 608 may transmit data (e.g., inference data) to machine learning model 610 and/or may receive output including an inference (e.g., a metric associated with an inference) from machine learning model 610. Scoring engine 608 may transmit a request to transformation engine 614 and/or may receive a response from transformation engine 614.

In some non-limiting embodiments or aspects, scoring engine 608 may communicate with orchestrator 604, machine learning models 610, and/or transformation engine 614 via an API. For example, scoring engine 608 may transmit a request to transformation engine 614 where the request may satisfy a communication protocol defined in the API. Transformation engine 614 may transmit a response to scoring engine 608 where the response satisfies the communication protocol defined in the API. In some non-limiting embodiments or aspects, the API (e.g., the communication protocol of the API) may be configured using a framework for communication protocols. In some non-limiting embodiments or aspects, scoring engine 608 may receive a response from transformation engine 614 based on a request transmitted to transformation engine 614.

In some non-limiting embodiments or aspects, scoring engine 608 may transmit a request to transformation engine 614 including raw data and/or aggregated data (e.g., an aggregation of data). Scoring engine 608 may receive a response from transformation engine 614 including transformed data (e.g., inference data) where the transformed data is capable of being processed by a machine learning model. In some non-limiting embodiments or aspects, scoring engine 608 may transmit the transformed data (e.g., inference data) to machine learning model 610 based on the request received from orchestrator 604 including the machine learning model that is selected by gateway 602 (e.g., based on the request for inference received from client device 606). Scoring engine 608 may transmit the transformed data to the machine learning model of the machine learning models 610 that is indicated as selected by gateway 602. In some non-limiting embodiments or aspects, orchestrator 604 may transmit a request to scoring engine 608 including an indication of the machine learning model that was selected.

In some non-limiting embodiments or aspects, machine learning models 610 may include one or more machine learning models. For example, machine learning models 610 may be the same as or similar to model and/or function libraries 508 and/or machine learning models as described herein. In some non-limiting embodiments or aspects, machine learning models 610 may be components of (e.g., parts of) inference service system 102 and/or inference service system 502. In some non-limiting embodiments or aspects, machine learning models 610 may be in communication with scoring engine 608. For example, machine learning models 610 may receive transformed data (e.g., inference data) from scoring engine 608 as input to machine learning model 610. Machine learning models 610 may process the transformed data to generate an inference (e.g., a prediction) as output. Machine learning model 610 may transmit the output back to scoring engine 608.

In some non-limiting embodiments or aspects, aggregation features engine 612 may include a microservice component (e.g., software component). For example, aggregation features engine 612 may be the same as or similar to the aggregation microservice as described herein. In some non-limiting embodiments or aspects, aggregation features engine 612 may be a component of (e.g., part of) inference service system 102 and/or inference service system 502. In some non-limiting embodiments or aspects, aggregation features engine 612 may be in communication with orchestrator 604 and/or database 616. For example, aggregation features engine 612 may receive a request from orchestrator 604 and/or may transmit a response to orchestrator 604. Aggregation features engine 612 may transmit a request to database 616 and/or may receive a response from database 616.

In some non-limiting embodiments or aspects, aggregation features engine 612 may communicate with orchestrator 604 and/or database 616 via an API (e.g., a Representational State Transfer (REST) API). For example, aggregation features engine 612 may transmit a request to database 616 where the request may satisfy a communication protocol defined in the API. Aggregation features engine 612 may transmit a response to orchestrator 604 where the response satisfies the communication protocol defined in the API. In some non-limiting embodiments or aspects, the API (e.g., the communication protocol of the API) may be configured using a framework for communication protocols. In some non-limiting embodiments or aspects, aggregation features engine 612 may receive a response from database 616 based on a request transmitted to database 616.

In some non-limiting embodiments or aspects, aggregation features engine 612 may receive a request from orchestrator 604 including an identifier associated with a type of data (e.g., transaction data). In some non-limiting embodiments or aspects, aggregation features engine 612 may transmit a request to database 616 based on the identifier associated with a type of data included in the request received from orchestrator 604. For example, aggregation features engine 612 may transmit a request to database 616 to request transaction data associated with a user (e.g., a user of a portable financial device, such as a credit card and/or a user associated with an account identifier) and/or transaction data associate with a user spanning a selected time period (e.g., transaction data from January 2022 to March 2022 for a user associated with an account identifier).

In some non-limiting embodiments or aspects, aggregation features engine 612 may determine an aggregation of data based on the machine learning model selected by gateway 602 and/or the payload included in the request for inference received by gateway 602. For example, aggregation features engine 612 may receive a request from orchestrator 604, including the machine learning model selected by gateway 602 and the payload included in the request for inference. Aggregation features engine 612 may transmit a request to database 616 to receive data (e.g., raw data) based on the request for inference. In some non-limiting embodiments or aspects, the request for inference may include an indication of a data type (e.g., transaction data) and an indication of an aggregation operation to process the raw data. For example, aggregation features engine 612 may receive a request from orchestrator 604, including an indication of transaction data and an indication of total transaction amount data for a user spanning a selected time period of January 2022 to March 2022. Aggregation features engine 612 may transmit a request to database 616 requesting all transaction data for the user from January 2022 to March 2022. In response to receiving transaction data for the user spanning from January 2022 to March 2022, aggregation features engine 612 may perform an aggregation operation of sum on the transaction amount feature (e.g., data point, property, and/or the like) of the transaction data, such that aggregation features engine 612 sums the transaction amounts from each transaction of the user spanning from January 2022 to March 2022 to get a total transaction amount for the time period spanning from January 2022 to March 2022.

In some non-limiting embodiments or aspects, transformation engine 614 may include a microservice component (e.g., software component). For example, transformation engine 614 may be the same as or similar to the transformation microservice as described herein. In some non-limiting embodiments or aspects, transformation engine 614 may be a component of (e.g., part of) inference service system 102 and/or inference service system 502. In some non-limiting embodiments or aspects, transformation engine 614 may be in communication with scoring engine 608. For example, transformation engine 614 may receive a request from scoring engine 608 and/or may transmit a response to scoring engine 608.

In some non-limiting embodiments or aspects, transformation engine 614 may communicate with scoring engine 608 via an API. For example, scoring engine 608 may transmit a request to transformation engine 614 where the request may satisfy a communication protocol defined in the API. Transformation engine 614 may transmit a response to scoring engine 608 where the response may satisfy the communication protocol defined in the API. In some non-limiting embodiments or aspects, the API (e.g., the communication protocol of the API) may be configured using a framework for communication protocols. In some non-limiting embodiments or aspects, transformation engine 614 may receive a request from scoring engine 608 based on the request transmitted to scoring engine 608 from orchestrator 604.

In some non-limiting embodiments or aspects, transformation engine 614 may receive a request from scoring engine 608, including data that is aggregated by aggregation features engine 612 (e.g., an aggregation of data). In some non-limiting embodiments or aspects, the request received by transformation engine 614 from scoring engine 608 may include an indication of a type of transformation (e.g., an indication of a transformation operation) that transformation engine 614 is requested to perform on the aggregation of data. For example, transformation engine 614 may receive a request from scoring engine 608, including an indication of an operation to resolve missing data (e.g., null values and/or the like) in the aggregation of data. As a further example, transformation engine 614 may process an aggregation of data, such as an aggregation of transaction data, to determine missing data and/or missing data points in the aggregation of data. Transformation engine 614 may determine that a transaction amount is missing in the aggregation of data and may generate a data point to fill in the missing data (e.g., a transaction value of $0, $10, $100, and/or the like).

In some non-limiting embodiments or aspects, database 616 may include a computing device (e.g., a database device) configured to communicate with aggregation features engine 612, inference service system 102, and/or inference system 502 via a communication network. For example, database 616 may include a server, a group of servers, and/or other like devices. In some non-limiting embodiments or aspects, database 616 may be associated with one or more computing devices providing interfaces, such that a user may interact with database 616 via the one or more computing devices. Database 616 may be in communication with aggregation features engine 612, inference service system 102, and/or inference service system 502, such that database 616 is separate from aggregation features engine 612, inference service system 102, and/or inference service system 502. Alternatively, in some non-limiting embodiments, database 616 may be part (e.g., a component) of aggregation features engine 612, inference service system 102, and/or inference service system 502.

In some non-limiting embodiments or aspects, database 616 may include a device capable of storing data (e.g., a storage device). In some non-limiting embodiments or aspects, database 616 may include a collection of data stored and accessible by one or more computing devices. Database 616 may include file system storage, cloud storage, in-memory storage, and/or the like. Database 616 may include non-volatile storage (e.g., flash memory, magnetic media, and/or the like), volatile storage (e.g., random-access memory and/or the like), or both non-volatile and volatile storage. In some non-limiting embodiments, database 616 may be a component of (e.g., part of) aggregation features engine 612, inference service system 102, and/or inference service system 502. In some non-limiting embodiments or aspects, database 616 may be hosted by a computing device (e.g., the computing device may store the database and its contents and permit other computing devices access to the database via a communication network) separate from aggregation features engine 612, inference service system 102, and/or inference service system 502.

The number and arrangement of devices and components (e.g., software components, microservice components, and/or the like) shown in FIG. 6 are provided as an example. There may be additional devices and/or components, fewer devices and/or components, different devices and/or components, or differently arranged devices and/or components than those shown in FIG. 6. In some instances, one or more devices and/or components shown in FIG. 6 may be implemented on a single computing device, a plurality of computing devices, and/or a plurality of computing devices communicating over one or more communication networks. Furthermore, two or more devices and/or components shown in FIG. 6 may be implemented within a single device and/or component, or a single device and or/components shown in FIG. 6 may be implemented as multiple, distributed devices and/or components. Additionally or alternatively, a set of devices and/or components (e.g., one or more devices and/or components) of implementation 600 may perform one or more functions described as being performed by another set of devices and/or components of implementation 600.

Figure 7:
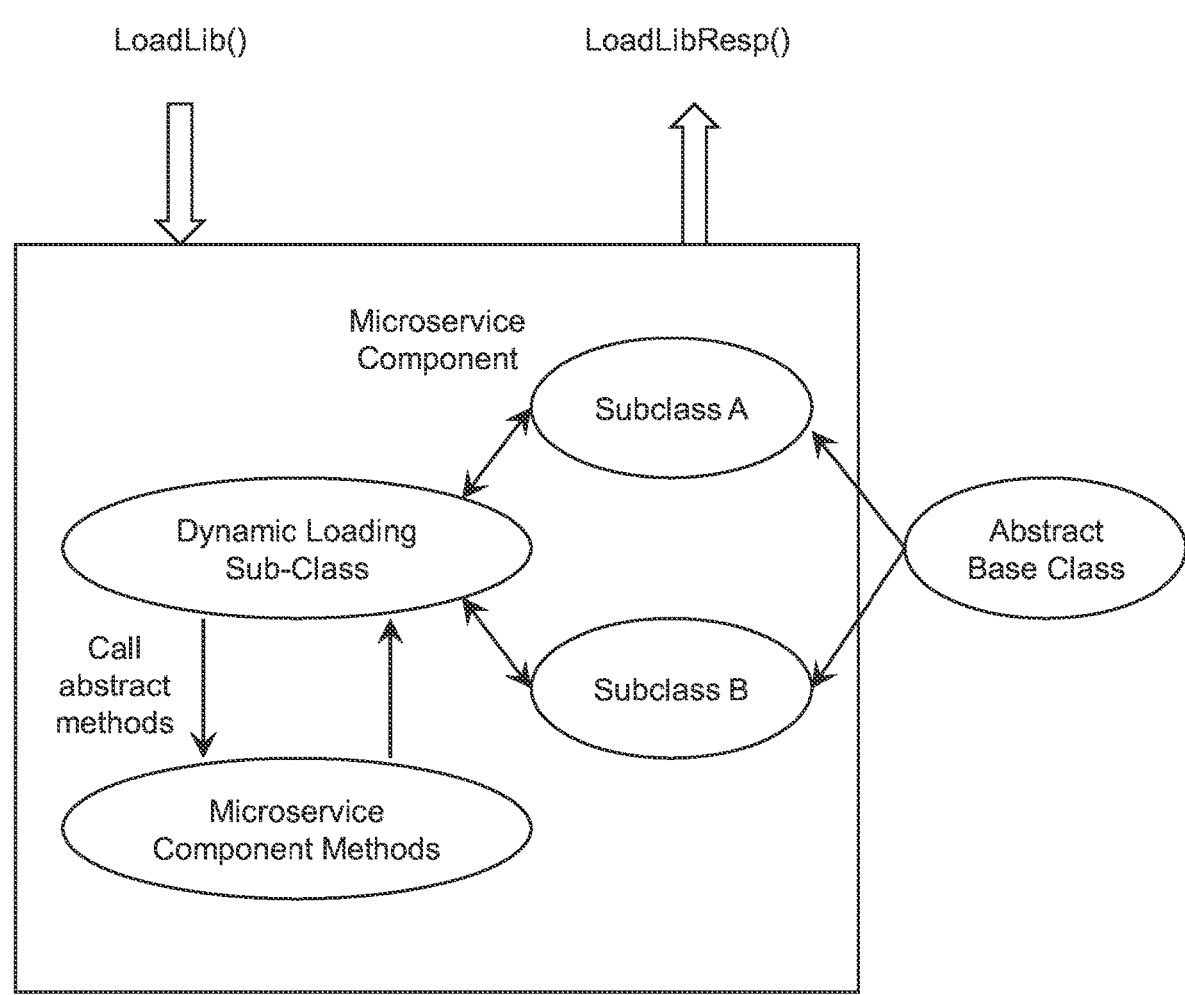
FIG. 7 is a diagram of a non-limiting embodiment or aspect of an implementation of a microservice component of one or more devices and/or components of FIG. 6.

Referring now to FIG. 7, FIG. 7 is a diagram of a non-limiting embodiment or aspect of an implementation 700 of a microservice component (e.g., transformation engine 614) of one or more devices and/or components of FIG. 6. In some non-limiting embodiments or aspects, implementation 700 may include a software component (e.g., a microservice component) that may be implemented on one or more computing devices. In some non-limiting embodiments or aspects, implementation 700 may include a generic software component defined by one or more instructions that, when executed by at least one processor, cause the at least one processor to perform one or more steps of a process (e.g., process 300) and or one or more functions of a system (e.g., a system that involves implementation 600).

As shown in FIG. 7, implementation 700 may include a microservice component (e.g., orchestrator 604, scoring engine 608, aggregation features engine 612 and/or transformation engine 614) and a base class (e.g., superclass, parent class, and/or the like), such as an abstract base class. In some non-limiting embodiments or aspects, the base class (e.g., the abstract base class) may define the properties and capabilities of a common microservice component (e.g., the transformation microservice, transformation engine 614) included in a system implementation (e.g., implementation 600). That is, the base class may define all properties and capabilities shared (e.g., common properties and capabilities) between the common microservice component within a system, such as inference service system 102 and/or inference service system 502, that may be used with any machine learning model of the plurality of machine learning models (e.g., machine learning model 610-1 to machine learning model 610-*n*). In this way, implementation 700 may provide for a generic system (e.g., inference service system 102 and/or inference service system 502) that may be developed more efficiently when adding (e.g., onboarding) new machine learning model implementations to the plurality of machine learning models by reducing the amount of time and resources required to implement, test, and deploy a new machine learning model. Additionally, the reuse of software instructions allows for the loading of classes (e.g., subclasses) and models (e.g., machine learning models) which may be used to accomplish a task (e.g., an inference task) in real-time, such that classes and models that do not need to be used would not be loaded by the system (e.g., inference service system 102 and/or inference service system 502), thus reducing the resources required to execute an inference system, such as inference service system 102 and/or inference service system 502.

In some non-limiting embodiments or aspects, a base class may refer to a class in object-oriented programming from which all other classes are derived within a software component. A base class may facilitate the creation of subclasses (e.g., derived classes, heir classes, child classes, and/or the like) that may reuse the software instructions that the subclasses inherited from the base class. In some non-limiting embodiments or aspects, a subclass may refer to a derivative class that inherits one or more properties and/or methods from one or more base classes. A subclass may include all properties and/or methods that are included in the base class, but a subclass may also have additional properties and/or methods that are not included in the base class. An abstract base class may refer to a base class that cannot be instantiated, that is, an abstract base class may act as a template (e.g., protocol, interface, signature, and/or the like) for subclasses, but the abstract base class cannot be loaded by a process itself. The properties and/or methods included in the abstract base class can only be loaded by a processor through a subclass. The abstract base class may include one or more abstract methods that may be implemented differently by different subclasses, but the method signatures (e.g., the method names, function names, and/or the like) of the abstract methods remain the same for all subclasses that inherit the abstract base class.

With continued reference to FIG. 7, the abstract base class may include one or more properties and/or one or more methods (e.g., abstract methods). The one or more properties and/or one or more methods may be shared between all subclasses that inherit the one or more properties and/or the one or more methods from the abstract base class. For example, inference service system 102 and/or inference service system 502 may include a transformation microservice (e.g., transformation engine 614) that includes an abstract base class. The abstract base class may include one or more properties including a feature map, a feature map output, and/or a configuration. The abstract base class may include one or more methods, including an abstract method that performs transformation (e.g., transformation (self, input_key_list={ })). As a further example, inference service system 102 and/or inference service system 502 may include a transformation microservice (e.g., transformation engine 614) that includes a subclass that inherits from the abstract base class. The subclass may include one or more properties including the feature map from the abstract base class, the feature map output from the abstract base class, the configuration from the abstract base class, model type, and/or additional properties not included in the abstract base class. The subclass may include one or more methods, including the abstract method that performs transformation from the abstract base class. However, the abstract method that performs transformation must be implemented (e.g., it cannot simply be a method signature, it must have implementation details that perform some action within the microservice component) within the subclass. For example, inference service system 102 and/or inference service system 502 may include a microservice component that includes a subclass that includes the abstract method that performs transformation. The abstract method that performs transformation may be implemented in the subclass, such that the abstract method that performs transformation includes transformation logic transmitted by a client device as the implementation details. In this way, inference service system 102 and/or inference service system 502 may receive logic from client devices (e.g., customers of inference service system 102 and/or inference service system 502), and inference service system 102 and/or inference service system 502 may implement the logic on the fly (e.g., in real-time) with respect to the request for inference. The logic may be loaded by inference service system 102 and/or inference service system 502, such that inference service system 102 and/or inference service system 502 may dynamically change to match the needs of the client device (e.g., the customer, the system transmitting the request for inference) and to provide more accurate inferences without rework or extensive change to the system.

With continued reference to FIG. 7, the microservice component (e.g., transformation engine 614) may include one or more subclasses. In some non-limiting embodiments or aspects, the one or more subclasses may correspond to one or more machine learning models of the plurality of machine learning models. For example, subclass A may correspond to machine learning model 610-1 and/or subclass B may correspond to machine learning model 610-2. In some non-limiting embodiments or aspects, inference service system 102 and/or inference service system 502 may load the one or more subclasses dynamically (e.g., load in real-time based on the request for inference and/or data received from the client device) based on the request for inference using the microservice component. For example, inference service system 102 and/or inference service system 502 may load a transformation subclass for the transformation microservice (e.g., transformation engine 614) dynamically based on the request for inference using the transformation microservice. Inference service system 102 and/or inference service system 502 may implement logic in one or more abstract methods included in the one or more subclasses (e.g., the one or more subclasses loaded dynamically) provided by the client device. In some non-limiting embodiments or aspects, inference service system 102 and/or inference service system 502 may call (e.g., execute) the abstract methods included in the one or more subclasses which implement the logic provided by the client device. In this way, inference service system 102 and/or inference service system 502 may provide for enhanced functionality of a machine learning framework while reducing the development time and resources required to onboard new machine learning models. The dynamic loading of subclasses allows for client devices (e.g., users) to supply custom logic on the fly and allows client devices to recycle previously used models and codes in order to provide accelerated onboarding time and reduce computing resources.

In some non-limiting embodiments or aspects, the microservice component (e.g., transformation engine 614) may call (e.g., execute) microservice component methods (methods only implemented by specific subclasses). In some non-limiting embodiments or aspects, the microservice component (e.g., transformation engine 614) may communicate with other microservice components via an API. For example, scoring engine 608 may transmit a request to transformation engine 614 where the request may satisfy a communication protocol defined in the API. The API may define the request protocol. The request may include a method (e.g., a method signature, a method name) of Load- Lib( ) (e.g., a method for making requests), where the method LoadLib( ) may accept arguments including a library file, a symbol file, and/or a request ID.

As a further example, transformation engine 614 may transmit a response to scoring engine 608 where the response may satisfy the communication protocol defined in the API. The API may define the response protocol. The response may include a method (e.g., a method signature, a method name) of LoadLibResp( ) (e.g., a method for responding to requests), where LoadLibResp( ) may accept arguments including a response status, a response status description, and/or a request ID. In some non-limiting embodiments or aspects, the API (e.g., the communication protocol of the API) may be configured using a framework for communication protocols (e.g., gRPC® and/or the like). In some non-limiting embodiments or aspects, the microservice component may receive a request (e.g., the LoadLib( ) request) based on inference service system 102 and/or inference service system 502 receiving the request for inference from client device 106 and/or client device 506. The microservice component may transmit a response (e.g., the LoadLibResp( ) response) based on receiving the request from another microservice component.

Although the present disclosure has been described in detail for the purpose of illustration based on what is currently considered to be the most practical and preferred embodiments or aspects, it is to be understood that such detail is solely for that purpose and that the present disclosure is not limited to the disclosed embodiments or aspects, but, on the contrary, is intended to cover modifications and equivalent arrangements that are within the spirit and scope of the appended claims. For example, it is to be understood that the present disclosure contemplates that, to the extent possible, one or more features of any embodiment can be combined with one or more features of any other embodiment.

What is claimed is:

1. A computer implemented method, comprising:

performing, with at least one processor, an onboarding process for a machine learning model, wherein performing the onboarding process for the machine learning model comprises:

dynamically loading one or more subclasses associated with one or more functions based on a template associated with the one or more functions and based on logic of the machine learning model, wherein dynamically loading the one or more subclasses associated with the one or more functions comprises:

determining a first subclass associated with a transformation function based on a template associated with the transformation function and the machine learning model; and determining a second subclass associated with an aggregation function based on the template associated with the aggregation function and the machine learning model;

receiving, with at least one processor, a request for inference, wherein the request comprises a payload;

selecting, with at least one processor, the machine learning model from a plurality of machine learning models based on the request for inference;

determining, with at least one processor, an aggregation of data based on the machine learning model and the payload of the request, wherein determining the aggregation of data comprises:

dynamically loading an aggregation microservice in real-time based on the payload of the request for inference and the second subclass associated with the aggregation function;

retrieving raw data from a database using the aggregation microservice; and determining the aggregation of data based on the raw data retrieved from the database;

transforming, with at least one processor, the aggregation of data into inference data using a transformation microservice based on the subclass associated with the transformation function, wherein transforming the aggregation of data into the inference data comprises:

dynamically loading the transformation microservice in real-time based on the request for inference and the first subclass associated with the transformation function; and generating the inference data by processing the aggregation of data using the transformation microservice, wherein the transformation microservice is used to perform one or more transformation operations on the aggregation of data to generate the inference data;

wherein the inference data has a configuration that is capable of being processed by the machine learning model; and generating, with at least one processor, an inference based on the inference data using the machine learning model.

2. The computer implemented method of claim 1, further comprising:

providing the inference to a client that transmitted the request for inference.

3. The computer implemented method of claim 1, further comprising:

executing an application programming interface (API) to determine whether an input dataset is available.

4. The computer implemented method of claim 1, wherein generating the inference based on the inference data using the machine learning model comprises:

generating an inference score based on the inference data using the machine learning model, wherein the inference score comprises a metric associated with a prediction that a transaction is associated with a predetermined condition.

5. A system comprising at least one processor, wherein the at least one processor is programmed or configured to:

perform an onboarding process for a machine learning model, wherein, when performing the onboarding process for the machine learning model, the at least one processor is programmed or configured to:

dynamically load one or more subclasses associated with one or more functions based on a template associated with the one or more functions and based on logic of the machine learning model, wherein, when dynamically loading the one or more subclasses associated with the one or more functions, the at least one processor is programmed or configured to:

determine a first subclass associated with a transformation function based on a template associated with the transformation function and the machine learning model; and determine a second subclass associated with an aggregation function based on the template associated with the aggregation function and the machine learning model;

receive a request for inference, wherein the request comprises a payload;

select the machine learning model from a plurality of machine learning models based on the request for inference;

determine an aggregation of data based on the machine learning model and the payload of the request, wherein, when determining the aggregation of data, the at least one processor is programmed or configured to:

dynamically load an aggregation microservice in real-time based on the payload of the request for inference and the second subclass associated with the aggregation function;

retrieve raw data from a database using the aggregation microservice; and determine the aggregation of data based on the raw data retrieved from the database;

transform the aggregation of data into inference data using a transformation microservice based on the subclass associated with the transformation function, wherein, when transforming the aggregation of data into the inference data, the at least one processor is programmed or configured to:

dynamically load the transformation microservice in real-time based on the request for inference and the first subclass associated with the transformation function; and generate the inference data by processing the aggregation of data using the transformation microservice, wherein the transformation microservice is used to perform one or more transformation operations on the aggregation of data to generate the inference data;

wherein the inference data has a configuration that is capable of being processed by the machine learning model; and generate an inference based on the inference data using the machine learning model.

6. The system of claim 5, wherein the at least one processor is further programmed or configured to:

provide the inference to a client that transmitted the request for inference.

7. The system of claim 5, wherein the at least one processor is further programmed or configured to:

execute an application programming interface (API) to determine whether an input dataset is available.

8. The system of claim 5, wherein, when generating the inference based on the inference data using the machine learning model, the at least one processor is programmed or configured to:

generate an inference score based on the inference data using the machine learning model, wherein the inference score comprises a metric associated with a prediction that a transaction is associated with a predetermined condition.

9. A computer program product comprising at least one non-transitory computer-readable medium including one or more instructions that, when executed by at least one processor, cause the at least one processor to:

perform an onboarding process for a machine learning model, wherein, the one or more instructions that cause the at least one processor to perform the onboarding process for the machine learning model, cause the at least one processor to:

dynamically load one or more subclasses associated with one or more functions based on a template associated with the one or more functions and based on logic of the machine learning model, wherein, the one or more instructions that cause the at least one processor to dynamically load the one or more subclasses associated with the one or more functions, cause the at least one processor to:

determine a first subclass associated with a transformation function based on a template associated with the transformation function and the machine learning model; and determine a second subclass associated with an aggregation function based on the template associated with the aggregation function and the machine learning model;

receive a request for inference, wherein the request comprises a payload;

select the machine learning model from a plurality of machine learning models based on the request for inference;

determine an aggregation of data based on the machine learning model and the payload of the request, wherein, the one or more instructions that cause the at least one processor to determine the aggregation of data, cause the at least one processor to:

dynamically load an aggregation microservice in real-time based on the payload of the request for inference and the second subclass associated with the aggregation function;

retrieve raw data from a database using the aggregation microservice; and determine the aggregation of data based on the raw data retrieved from the database;

transform the aggregation of data into inference data using a transformation microservice based on the subclass associated with the transformation function, wherein, the one or more instructions that cause the at least one processor to transform the aggregation of data into the inference data, cause the at least one processor to:

dynamically load the transformation microservice in real-time based on the request for inference and the first subclass associated with the transformation function; and generate the inference data by processing the aggregation of data using the transformation microservice, wherein the transformation microservice is used to perform one or more transformation operations on the aggregation of data to generate the inference data;

wherein the inference data has a configuration that is capable of being processed by the machine learning model; and generate an inference based on the inference data using the machine learning model.

10. The computer program product of claim 9, wherein the one or more instructions further cause the at least one processor to:

provide the inference to a client that transmitted the request for inference.

11. The computer program product of claim 9, wherein the one or more instructions further cause the at least one processor to:

execute an application programming interface (API) to determine whether an input dataset is available.

* * * * *